US011329969B2

(12) United States Patent
Lee et al.

(10) Patent No.: US 11,329,969 B2
(45) Date of Patent: May 10, 2022

(54) NETWORK SECURITY ARCHITECTURE

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 235 days.

(21) Appl. No.: 16/445,059

(22) Filed: Jun. 18, 2019

(65) Prior Publication Data

US 2019/0306140 A1 Oct. 3, 2019

Related U.S. Application Data

(62) Division of application No. 15/160,326, filed on May 20, 2016, now Pat. No. 10,362,011.

(Continued)

(51) Int. Cl.
*H04L 29/06* (2006.01)
*H04W 12/03* (2021.01)
(Continued)

(52) U.S. Cl.
CPC .......... *H04L 63/08* (2013.01); *H04L 63/0428* (2013.01); *H04L 63/06* (2013.01);
(Continued)

(58) Field of Classification Search
CPC ..... H04L 63/08; H04L 63/0428; H04L 63/06; H04L 2463/061; H04L 67/42;
(Continued)

(56) References Cited

U.S. PATENT DOCUMENTS 8,477,724 B2  7/2013 Bakker et al.
9,060,270 B2  6/2015 Liu et al.
(Continued)

FOREIGN PATENT DOCUMENTS

CN    104540107 A    4/2015
KR    20130037481 A  4/2013
(Continued)

OTHER PUBLICATIONS

Taiwan Search Report—TW105118428—TIPO—dated Jan. 21, 2020.

(Continued)

*Primary Examiner* — Huan V Doan
(74) *Attorney, Agent, or Firm* — Loza & Loza, LLP

(57) ABSTRACT

In an aspect, a network supporting client devices includes one or more network nodes implementing network functions. Such network functions enable a client device to apply a security context to communications with the network when the client device is not in a connected mode. The client device obtains a user plane key shared with a user plane network function implemented at a first network node and/or a control plane key shared with a control plane network function implemented at a second network node. The client device protects a data packet with the user plane key or a control packet with the control plane key. The data packet includes first destination information indicating the first network node and the control packet includes second destination information indicating the second network node. The client device transmits the data packet or control packet.

20 Claims, 22 Drawing Sheets

Related U.S. Application Data

(60) Provisional application No. 62/191,459, filed on Jul. 12, 2015.

(51) Int. Cl.
| | |
|---|---|
| H04L 67/01 | (2022.01) |
| H04W 12/10 | (2021.01) |
| H04W 4/70 | (2018.01) |
| H04W 12/02 | (2009.01) |

(52) U.S. Cl.
CPC ............. *H04W 12/03* (2021.01); *H04L 67/42* (2013.01); *H04L 2463/061* (2013.01); *H04W 4/70* (2018.02); *H04W 12/02* (2013.01); *H04W 12/10* (2013.01)

(58) Field of Classification Search
CPC ....... H04W 12/03; H04W 12/02; H04W 4/70; H04W 12/10; H04W 12/106
See application file for complete search history.

(56) References Cited

U.S. PATENT DOCUMENTS

| | | |
|---|---|---|
| 2008/0181411 A1 | 7/2008 | Norrman et al. |
| 2010/0046418 A1 | 2/2010 | Horn et al. |
| 2010/0235634 A1 | 9/2010 | Fischer |
| 2011/0185049 A1* | 7/2011 | Atreya ................ H04W 12/082 709/222 |
| 2011/0286393 A1* | 11/2011 | Fouren .................... H04L 47/14 370/328 |
| 2012/0182929 A1 | 7/2012 | Chen et al. |
| 2012/0252481 A1 | 10/2012 | Anpat et al. |
| 2012/0281566 A1* | 11/2012 | Pelletier ................ H04W 76/27 370/252 |
| 2012/0297473 A1 | 11/2012 | Case et al. |
| 2013/0044708 A1* | 2/2013 | Kim .................... H04L 65/4076 370/329 |
| 2013/0046821 A1 | 2/2013 | Alanara et al. |
| 2013/0083726 A1* | 4/2013 | Jain ................... H04W 28/0215 370/328 |
| 2013/0301611 A1* | 11/2013 | Baghel .................. H04W 72/04 370/331 |
| 2013/0308564 A1* | 11/2013 | Jain ....................... H04L 1/0041 370/329 |
| 2014/0126448 A1 | 5/2014 | Punz et al. |
| 2014/0302820 A1 | 10/2014 | Jones |
| 2015/0063368 A1 | 3/2015 | Sharma et al. |
| 2015/0124708 A1 | 5/2015 | Blankenship et al. |
| 2015/0141030 A1 | 5/2015 | Basu-Mallick et al. |
| 2015/0223058 A1 | 8/2015 | Yang et al. |
| 2015/0358813 A1 | 12/2015 | Lee et al. |
| 2016/0057797 A1* | 2/2016 | Bangolae .......... H04W 72/0413 370/311 |
| 2016/0150564 A1* | 5/2016 | Quan ................ H04W 28/0278 370/329 |
| 2016/0309379 A1* | 10/2016 | Pelletier ................ H04W 76/12 |
| 2017/0012956 A1 | 1/2017 | Lee et al. |
| 2018/0062847 A1 | 3/2018 | Mildh et al. |
| 2019/0306141 A1 | 10/2019 | Lee et al. |

FOREIGN PATENT DOCUMENTS

| | | |
|---|---|---|
| WO | 2012175664 A2 | 12/2012 |
| WO | 2013006219 A1 | 1/2013 |
| WO | 2013065996 A1 | 5/2013 |

OTHER PUBLICATIONS

Ericsson et al., "More Details on Fast Path Security Protocol" [online], 3GPP TSG SA WG3 (Security) Meeting #72, S3-130778, Jul. 1, 2013, [Searched on Aug. 11, 2020], pp. 1-9, Retrieved from the Internet: URL:https://www.3gpp.org/ftp/tsg_sa/WG3_Security/TSGS3_72_Qingdao/Docs/S3-130778.zip.

3GPP TR 23.888 V 11.0.0, 3rd Generation Partnership Project; Technical Specification Group Services and System Aspects; System improvements for Machine-Type Communications (MTC) (Release 11), 2012, 165 pages.

3GPP TR 23.887: 3rd Generation Partnership Project, Technical Specification Group Services and System Aspects, Study on Machine-Type Communications (MTC) and Other Mobile Data Applications Communications Enhancements (Release 12), 3GPP Standard, 3rd Generation Partnership Project (3GPP), Mobile Competence Centre, 650, Route Des Lucioles, F-06921 Sophia-Antipolis Cedex, France, vol. SA WG2, No. V12.0.0, Dec. 20, 2013 (Dec. 20, 2013), pp. 1-151, XP050729146, [retrieved on Dec. 20, 2013] sections 5.1.2, 7, 8.1, 8.3, 8.4, 9.4, Annex A.

"3rd Generation Partnership Project; Technical Specification Group Services and System Aspects; Security aspects of Machine-Type and other mobile data applications Communications enhancements; (Release 12)", 3GPP Draft; 33868-100, 3rd Generation Partnership Project (3GPP), Mobile Competence Centre ; 650, Route Des Lucioles ; F-06921 Sophia-Antipolis Cedex ; France Mar. 5, 2014 (Mar. 5, 2014), XP050802671, Retrieved from the Internet: URL:http://www.3gpp.org/ftp/Meetings 3GPP_SYNC/SA/SA/Docs/.

Ericsson et al.,"More details on Fast Path Security Protocol," vol. SA W63, No. Qingdao, China; Jul. 8, 2013-Jul. 12, 2013 Jul. 12, 2013 (Jul. 12, 2013), XP050727211, 10 Pages, Retrieved from the Internet: URL:http://www.3gpp.org/ftp/tsg_sa/WG3_Security/TSGS3_72_Qingdao/Docs/ [retrieved an Jul. 12, 2013].

International Search Report and Written Opinion—PCT/US2016/037068—ISA/EPO—dated Oct. 21, 2016.

European Search Report—EP21180895—Search Authority—Munich—dated Sep. 15, 2021.

Qualcomm Incorporated, et al., "Efficient Small-Data Transmission with S1-Based Architecture," 3GPP TSG-SA WG2#110, 3GPP Draft, S2-152664_WAS2614_WAS2552_WAS2259_CIOT_SMALL_DATA-R2, 3rd Generation Partnership Project (3GPP), Mobile Competence Centre, 650, Route Des Lucioles, F-06921, Sophia-Antipolis Cedex, France, vol. SA WG2, No. Dubrovnik, Croatia, Jul. 6, 2015-Jul. 10, 2015, Jul. 10, 2015, (Jul. 10, 2015), XP050988284, Jul. 6-10, 2015, 10 Pages, Dubrovnik, Croatia, URL: http://www.3gpp.org/ftp/tsg_sa/WG2_Arch/TSGS2_110_Dubrovnik/.

* cited by examiner

NETWORK SECURITY ARCHITECTURE

CROSS REFERENCE TO RELATED APPLICATIONS

This is a divisional application of U.S. application Ser. No. 15/160,326 entitled "Network Security Architecture" filed on May 20, 2016, which claims priority to and the benefit of U.S. Provisional Application Ser. No. 62/191,459 entitled "IoT Security Architecture" filed on Jul. 12, 2015, the entire contents of which are incorporated herein by reference.

INTRODUCTION

Field of the Disclosure

Aspects of the disclosure relate generally to communication, and more specifically, but not exclusively, to an Internet of Things (IoT) network architecture.

BACKGROUND

The capabilities of electronic devices to collect, process, and exchange data are continuing to grow. Moreover, an increasing number of these electronic devices are being provided with network connectivity. Such capabilities and features are enabling many electronic devices to evolve into Internet of Things (IoT) devices. As the number of these types of electronic devices continues to rapidly increase, networks may not have the resources to adequately support these electronic devices.

For example, in an IoT environment, a network (e.g., an LTE network) may need to support a large number (e.g., billions) of IoT devices (e.g., client devices that attach to the network in a reduced data transfer mode or a low power consumption mode). Since the amount of resources allocated by the network for IoT purposes may be limited, the network may not be able to maintain all contexts for these types of devices. The context, which is used for user plane data transmissions for a client device, may reduce the amount of signaling to be performed by the client device in order to communicate with the network. In light of these circumstances, the network access node typically removes (e.g., deletes) the client device context when the client device enters an idle mode and establishes a new client device context when the client device enters a connected mode (also referred to as an active mode). This idle mode to connected mode transition involves substantial overhead for a client device in terms of signaling messages. Moreover, such idle mode to connected mode transitions may cause the client device to remain awake for longer periods of time and, therefore, may increase the power consumption of the client device.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method for a client device in a network is provided. The client device may register to the network, obtain at least a user plane key shared with a user plane network function implemented at a first network node or a control plane key shared with a control plane network function implemented at a second network node, protect a data packet with the user plane key or a control packet with the control plane key, and transmit the data packet or the control packet. In an aspect, the data packet includes first destination information indicating that the data packet is to be processed at the first network node, the first destination information enabling a network access node to forward the data packet to the first network node, and the control packet includes second destination information indicating that the control packet is to be processed at the second network node, the second destination information enabling the network access node to forward the control packet to the second network node. In an aspect, the client device may receive a packet from the network, determine whether the received packet includes data or control information, and decode the received packet with the user plane key or the control plane key based on the determination. In an aspect, the client device may decode the received packet by decrypting and verifying the received packet with the user plane key or the control plane key. In an aspect, the client device may verify the received packet by determining a first message authentication code by applying a message authentication code generation algorithm based on the received packet and either the user plane key or the control plane key, and comparing the first message authentication code to a second message authentication code associated with the received packet. In an aspect, the client device may obtain at least one of a user plane security context indicating network state information for the client device with respect to a user plane, or a control plane security context indicating network state information for the client device with respect to a control plane. In an aspect, the client device may obtain the user plane security context by deriving a first encryption key and a first integrity key based on the user plane key, and may obtain the control plane security context by deriving a second encryption key and a second integrity key based on the control plane key. In an aspect, the user plane security context or the control plane security context does not include access stratum security protection. In an aspect, a user plane network function identifier or a control plane network function identifier is included in a header of the received packet, and wherein the client device is registered in a reduced data transfer mode. In an aspect, the data packet is encrypted or integrity protected, or both encrypted and integrity protected, based on the user plane key, and wherein the control packet is encrypted or integrity protected, or both encrypted and integrity protected, based on the control plane key. In an aspect, the client device may register to the network by transmitting a request to attach to the network, and receiving, from the network, a message associated with an authentication procedure in response to the request. In such aspect, the user plane key or the control plane key is obtained based on the message, and the attach request indicates that the client device is to attach in a reduced data transfer mode.

In an aspect, a client device is provided. The client device may include means for registering to the network, means for obtaining at least a user plane key shared with a user plane network function implemented at a first network node or a control plane key shared with a control plane network function implemented at a second network node, means for protecting a data packet with the user plane key or a control packet with the control plane key, and means for transmitting the data packet or the control packet. The data packet may include first destination information indicating that the data packet is to be processed at the first network node, the first destination information enabling a network access node to forward the data packet to the first network node, and the control packet may include second destination information indicating that the control packet is to be processed at the second network node, the second destination information enabling the network access node to forward the control packet to the second network node. In an aspect, the client device may include means for receiving a packet from the network, means for determining whether the received packet includes data or control information, and means for decoding the received packet with the user plane key or the control plane key based on the determination. In an aspect, the means for decoding the received packet is configured to decrypt and verify the received packet with the user plane key or the control plane key. In an aspect, the means for verifying the received packet may be configured to determine a first message authentication code by applying a message authentication code generation algorithm based on the received packet and either the user plane key or the control plane key, and compare the first message authentication code to a second message authentication code associated with the received packet. In an aspect, the client device may further include means for obtaining at least one of a user plane security context indicating network state information for the client device with respect to a user plane, or a control plane security context indicating network state information for the client device with respect to a control plane. In an aspect, the means for obtaining the user plane security may be configured to derive a first encryption key and a first integrity key based on the user plane key, and wherein obtaining the control plane security context comprises deriving a second encryption key and a second integrity key based on the control plane key. In an aspect, the user plane security context or the control plane security context does not include access stratum security protection. In an aspect, a user plane network function identifier or a control plane network function identifier is included in a header of the received packet, and wherein the client device is registered in a reduced data transfer mode. In an aspect, the data packet is encrypted or integrity protected, or both encrypted and integrity protected, based on the user plane key, and wherein the control packet is encrypted or integrity protected, or both encrypted and integrity protected, based on the control plane key. In an aspect, the means for registering to the network may be configured to transmit a request to attach to the network, and receive, from the network, a message associated with an authentication procedure in response to the request. In such aspect, the user plane key or the control plane key is obtained based on the message, and wherein the attach request indicates that the client device is to attach in a reduced data transfer mode.

In an aspect, a method for a network access node is provided. The network access node may receive a first packet from a client device, determine a next hop network node based on a network attach mode of the client device, and forward the first packet to the next hop network node without verifying the first packet received from the client device when the network attach mode is a reduced data transfer mode. In an aspect, the network access node may receive a second packet from a network node, and forward the second packet received from the network node to the client device without protecting the second packet when the network attach mode of the client device is the reduced data transfer mode. In an aspect, the network access node may receive, from the client device, a request to attach to a network with an indication of the network attach mode, wherein the network attach mode is the reduced data transfer mode. In an aspect, the determination of the next hop network node is based on preconfigured information at the network access node or based on destination information included in the first packet, wherein the network attach mode is the reduced data transfer mode. In an aspect, the destination information includes a network function identifier that enables identification of a network node implementing a network function. In an aspect, the network function identifier is associated with a control plane network function implemented at a first network node or a user plane network function implemented at a second network node. In an aspect, the network access node may add, to the first packet, a temporary identifier associated with the client device, wherein the first packet is a data packet or a control packet, and may store the temporary identifier. In an aspect, the temporary identifier is a cell radio network temporary identifier (C-RNTI), and wherein the temporary identifier is stored for a predetermined period of time. In an aspect, the network access node may identify the client device from a temporary identifier in the second packet, wherein the second packet is a data packet or a control packet. In an aspect, the network access node may remove the temporary identifier from the second packet prior to forwarding the second packet.

In an aspect, a network access node is provided. The network access node may include means for receiving a first packet from a client device, means for determining a next hop network node based on a network attach mode of the client device, and means for forwarding the first packet to the next hop network node without verifying the first packet received from the client device when the network attach mode is a reduced data transfer mode. In an aspect, the network access node may further include means for receiving a second packet from a network node, and means for forwarding the second packet received from the network node to the client device without protecting the second packet when the network attach mode of the client device is the reduced data transfer mode. In an aspect, the network access node may further include means for receiving, from the client device, a request to attach to a network with an indication of the network attach mode, wherein the network attach mode is the reduced data transfer mode. In an aspect, the determination of the next hop network node is based on preconfigured information at the network access node or based on destination information included in the first packet, wherein the network attach mode is the reduced data transfer mode. In an aspect, the destination information includes a network function identifier that enables identification of a network node implementing a network function. In an aspect, the network function identifier is associated with a control plane network function implemented at a first network node or a user plane network function implemented at a second network node. In an aspect, the network access node may include means for adding, to the first packet, a temporary identifier associated with the client device, wherein the first packet is a data packet or a control packet, and means for storing the temporary identifier. In an aspect, the temporary identifier is a cell radio network temporary identifier (C-RNTI), and wherein the temporary identifier is stored for a predetermined period of time. In an aspect, the network access node may further include means for identifying the client device from a temporary identifier in the second packet, wherein the second packet is a data packet or a control packet. In an aspect, the network access node may further include means for removing the temporary identifier from the second packet prior to forwarding the second packet.

In an aspect, a method for a first network node is provided. The first network node may establish, at a control plane network function implemented at the first network node, a security context for a client device, obtain, at the control plane network function implemented at the first network node, a user plane key for a user plane network function implemented at a second network node, and transfer, from the control plane network function implemented at the first network node, the user plane key to the user plane network function implemented at the second network node. In an aspect, the first network node may establish the security context for the client device by performing a mutual authentication procedure with the client device. In an aspect, the first network node may obtain the user plane key by deriving the user plane key from a session credential established during the mutual authentication procedure. In an aspect, the first network node may obtain, at the control plane network function implemented at the first network node, a control plane key for the control plane network function.

In an aspect, a first network node is provided. The first network node may include means for establishing, at a control plane network function implemented at the first network node, a security context for a client device, means for obtaining, at the control plane network function implemented at the first network node, a user plane key for a user plane network function implemented at a second network node, and means for transferring, from the control plane network function implemented at the first network node, the user plane key to the user plane network function implemented at the second network node. In an aspect, the means for establishing the security context for the client device may be configured to perform a mutual authentication procedure with the client device. In an aspect, the means for obtaining the user plane key may be configured to derive the user plane key from a session credential established during the mutual authentication procedure. In an aspect, the first network node may further include means for obtaining, at the control plane network function implemented at the first network node, a control plane key for the control plane network function.

In an aspect, a method for a network node is provided. The network node may obtain, at a user plane network function implemented at the network node, a security context for a client device. The network node may determine, at the user plane network function implemented at the network node, a key to be used at least for decryption or verification of a data packet from the client device, receive, at the user plane network function implemented at the network node, the data packet from the client device, and decrypt and verify, at the user plane network function implemented at the network node, the data packet from the client device based on the key. In an aspect, network node may obtain the security context by receiving the security context from a control plane network function of the network node. In an aspect, the network node may receive, at the user plane network function implemented at the network node, a data packet for the client device from an application server or gateway. The network node may determine, at the user plane network function implemented at the network node, at least one key associated with the client device, and may protect, at the user plane network function implemented at the network node, the data packet for the client device using the at least one key. In an aspect, the network node may transmit, from the user plane network function implemented at the network node, the data packet for the client device to the next hop network node. In an aspect, the network node may protect the data packet for the client device by encrypting or integrity protecting the data packet, or both encrypting and integrity protecting the data packet, for the client device.

In an aspect, a network node is provided. The network node may include means for obtaining, at a user plane network function implemented at the network node, a security context for a client device, means for determining, at the user plane network function implemented at the network node, a key to be used at least for decryption or verification of a data packet from the client device, means for receiving, at the user plane network function implemented at the network node, the data packet from the client device, and means for decrypting and verifying, at the user plane network function implemented at the network node, the data packet from the client device based on the key. In an aspect, the means for obtaining the security context may be configured to receive the security context from a control plane network function of the network node. In an aspect, network node may further include means for receiving, at the user plane network function implemented at the network node, a data packet for the client device from an application server or gateway, means for determining, at the user plane network function implemented at the network node, at least one key associated with the client device, and means for protecting, at the user plane network function implemented at the network node, the data packet for the client device using the at least one key. In an aspect, the network node may further include means for transmitting, from the user plane network function implemented at the network node, the data packet for the client device to the next hop network node. In an aspect, the means for protecting the data packet for the client device may be configured to encrypt or integrity protect the data packet, or both encrypt and integrity protect the data packet, for the client device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
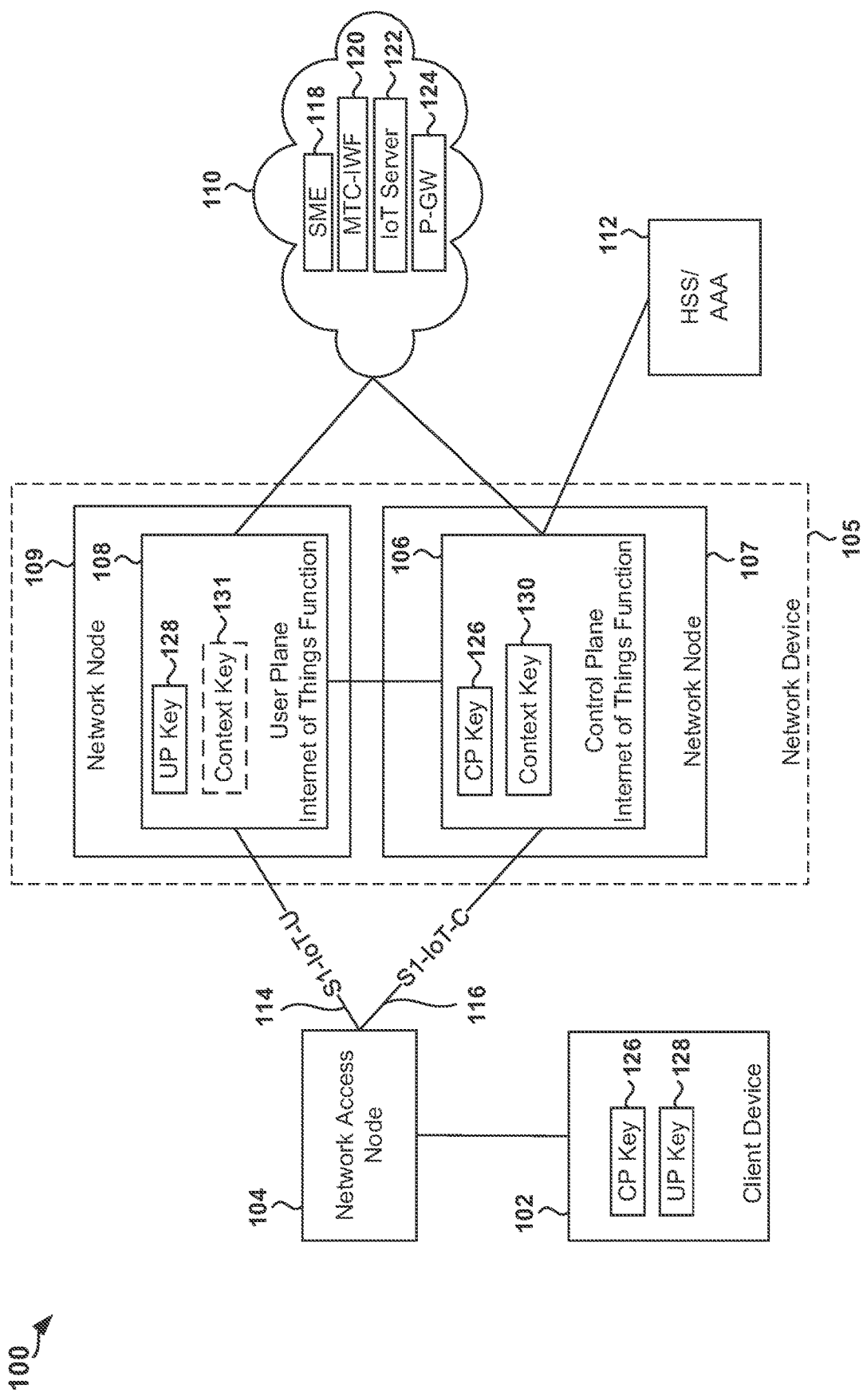
FIG. 1 is a block diagram of an Internet of Things (IoT) network architecture in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a network, such as Long Term Evolution (LTE) network, the user plane security terminates at the network access node (e.g., eNodeB, base station, or network access point). As such, the network access node should have a context for a client device (also referred to as an Internet of Things (IoT) device) for user plane data transmissions. For example, the client device may be a cellular telephone (e.g., a smartphone), a personal computer (e.g., a laptop computer), a gaming device, or any other suitable device that is configured to communicate with the network. The context for the client device may include network state information associated with the client device, such as a client device security context, and/or an evolved Universal Mobile Telecommunications System (UMTS) Terrestrial Radio Access Network (E-UTRAN) radio access bearer (eRAB) (e.g., radio bearer and S1 bearer). The context for the client device may reduce the amount of signaling to be performed by the client device in order to communicate with the network.

As discussed above, a network (e.g., an LTE network) may need to support a large number (e.g., billions) of Internet of Things (IoT) devices. For example, an IoT device may be a client device that attaches to the network as an IoT device (e.g., the client device may operate in an IoT device mode), attaches in a low power consumption mode, or attaches for purposes of reduced data transfer between the client device and the network. In an aspect, the reduced data transfer mode may involve infrequent small data (e.g., a single packet or a few packets) transmissions or short bursts of data. Therefore, in the present disclosure, the term client device used herein also refers to an IoT device. A client device, for example, may be a cellular telephone (e.g., a smartphone), a personal computer (e.g., a laptop), a gaming device, an automobile, an appliance, or any other suitable device that is configured to communicate with the network. In some aspects, the client device may be referred to as a user equipment (UE) or an access terminal (AT). In some aspects, a client device as referred to herein may be a mobile device or a static device.

Since the amount of resources, such as IoT network functions and other IoT related equipment, allocated by the network for IoT purposes may be limited, the network functions may not be able to maintain the contexts for all client devices. Moreover, IoT device may frequently be inactive. For example, client devices may wake up every 10 minutes or longer, send traffic to a server, and immediately enter a sleep mode.

In light of these circumstances, the network access node typically removes (e.g., deletes) the client device context when the client device enters an idle mode and establishes a new client device context when the client device enters a connected mode (also referred to as an active mode). This idle mode to connected mode transition involves substantial overhead for a client device in terms of signaling messages. Moreover, such idle mode to connected mode transitions may cause the client device to remain awake for longer periods of time and, therefore, may increase the power consumption of the client device.

The aspects disclosed herein include network architectures for client devices, from an upper-layer perspective, for achieving ultra-low client device power consumption, a large number of devices per cell, and/or a small spectrum. Dedicated network functions are introduced to enable independent deployment and remove scalability/inter-working requirements. Security is anchored at an IoT network function (also referred to as an IoT Function (IoTF)) implemented at a network device. The IoT network function may allow the architecture to achieve efficient data transmission for client devices. According to various aspects, the architecture may allow no security context to be maintained at a network access node (e.g., eNB, base station, network access point) for data transfer to or from client devices.

To avoid affecting normal packet data network (PDN) connection/traffic of client devices, dedicated core network resources are allocated for small data transfer. The network may allocate dedicated physical (PHY) layer resources for access control to also limit small data traffic. A client device context may be used for small data transfer to eliminate a client device's semi-persistent context at an IoTF when the client device is in an idle state.

In an aspect, the IoTF may include a control plane IoTF (IoTF-C) and a user plane IoTF (IoTF-U). In some aspects, such IoTF-C and IoTF-U may be implemented in a single IoTF. In other aspects, such IoTF-C and IoTF-U may be implemented as separate IoTFs. In an aspect of the present disclosure, an IoTF-C may have functions similar to a mobility management entity (MME). In an aspect of the present disclosure, an IoTF-U may be the mobility and security anchor for user plane data traffic. In an aspect of the present disclosure, an IoTF-U may have functions similar to a serving gateway (S-GW) and/or a network access node (e.g., evolved Node B (eNB), base station, or network access point).

In order to allow the network functions (e.g., IoTF-C, IoTF-U) to optimize resource usage for client devices, various aspects of the disclosed IoT network architectures may implement a design protocol in which a context for a client device is carried in a packet (e.g., IP packet) and the IoTF (e.g., an IoTF that includes an IoTF-C and an IoTF-U) creates the context for the client device opportunistically. This enables network functions to maintain minimal to no network state information for the client device and minimal to no signaling overhead. It should be understood that the disclosed IoT network architectures and the functions included therein may be used for any type of small data transfer. For example, a client device (e.g., smartphone) may have a nominal mode where it establishes a connection and transfers data, but also uses procedures as disclosed herein to transfer data using a client device context.

IoT Network Architecture

FIG. 1 is a block diagram of an IoT network architecture 100 in accordance with various aspects of the present disclosure. As shown in FIG. 1, the IoT network architecture 100 includes a client device 102 (also referred to as an IoT device), a network access node 104, a network device 105, a service network 110, and a home subscriber server (HSS)/authentication, authorization, and accounting (AAA) server 112. In one aspect, the network access node 104 may be an eNB, base station, or a network access point. In one aspect, the network device 105 may include one or more processing circuits and/or other appropriate hardware configured to implement an IoTF. In one aspect of the present disclosure, an IoTF may include a control plane IoT Function (IoTF-C) 106 and a user plane IoT Function (IoTF-U) 108. For example, the IoTF-C 106 may be implemented at a first network node 107 and the IoTF-U 108 may be implemented at a second network node 109. In accordance with the various aspects disclosed herein, the term "node" may represent a physical entity, such as a processing circuit, a device, a server, or a network entity, included in the network device 105. Accordingly, for example, a network node may be referred to as a network node device.

In one aspect, the IoTF-C 106 and the IoTF-U 108 may be implemented at the same hardware platform (e.g., one or more processing circuits and other associated hardware components, such as memory). In such aspect, for example, the IoTF-C 106 may be implemented at a first virtual machine (e.g., a first operating system) provided on a hardware platform (e.g., the network device 105) and the IoTF-U 108 may be implemented at a second virtual machine (e.g., a second operating system) provided on the hardware platform.

As shown in FIG. 1, the IoTF-C 106 is in communication with the network access node 104 via a first S1 connection 116, and the IoTF-U 108 is in communication with the network access node 104 via a second S1 connection 114. In an aspect of the present disclosure, the service network 110 may include a number of entities, functions, gateways, and/or servers configured to provide various types of services. For example, the service network 110 may include a short message entity (SME) 118, a machine type communication interworking function (MTC-IWF) 120, an IoT server 122, and/or a packet data network (PDN) gateway (P-GW) 124. It should be understood that the service network 110 disclosed in FIG. 1 serves as one example and that in other aspects, the service network 110 may include different types of entities, functions, and/or servers than those disclosed in FIG. 1.

In an aspect of the present disclosure, the IoTF implemented at the network device 105 may provide control plane and user plane functionality. In an aspect of the present disclosure, the IoTF-C 106 handles control plane signaling (e.g., packets carrying control information, herein referred to as "control packets") for client devices. For example, the IoTF-C 106 may perform mobility and session management for client devices, perform authentication and key agreement (also referred to as an AKA procedure) with client devices, and/or may create security contexts for client devices. In an aspect of the present disclosure, the IoTF-C 106 may derive control plane (CP) key(s) 126 for control plane traffic associated with the client device 102, user plane (UP) key(s) 128 for user plane traffic associated with the client device 102, and/or a context key(s) 130 for generating an encrypted client device context and/or encrypted network reachability context for the client device 102. In an aspect of the present disclosure, the IoTF-C 106 may provide the user plane key(s) 128 and/or at least one of the context key(s) 130 to the IoTF-U 108. Accordingly, in some aspects, the IoTF-U 108 may include the user plane key(s) 128 and/or the context key(s) 131 provided by the IoTF-C 106.

In an aspect of the present disclosure, the IoTF-U 108 may handle user plane traffic for client devices. For example, the IoTF-U 108 may derive a ciphering key and an integrity key (e.g., an Authenticated Encryption with Associated Data (AEAD) cipher using the UP key 128), create a client device context (also referred to as an IoT device context) on-the-fly, authenticate and decipher uplink (UL) packets sent by client devices and forward the uplink packets to a PDN or P-GW (e.g., P-GW 124), cipher and authenticate downlink (DL) packets for connected client devices and forward the downlink packets to the next hop network access node (e.g., eNB), and/or buffer downlink packets for idle client devices during paging. In an aspect of the present disclosure, the IoTF-U 108 may serve as a mobility and security anchor for data traffic.

Exemplary Key Hierarchy for an IoT Network

Figure 2:
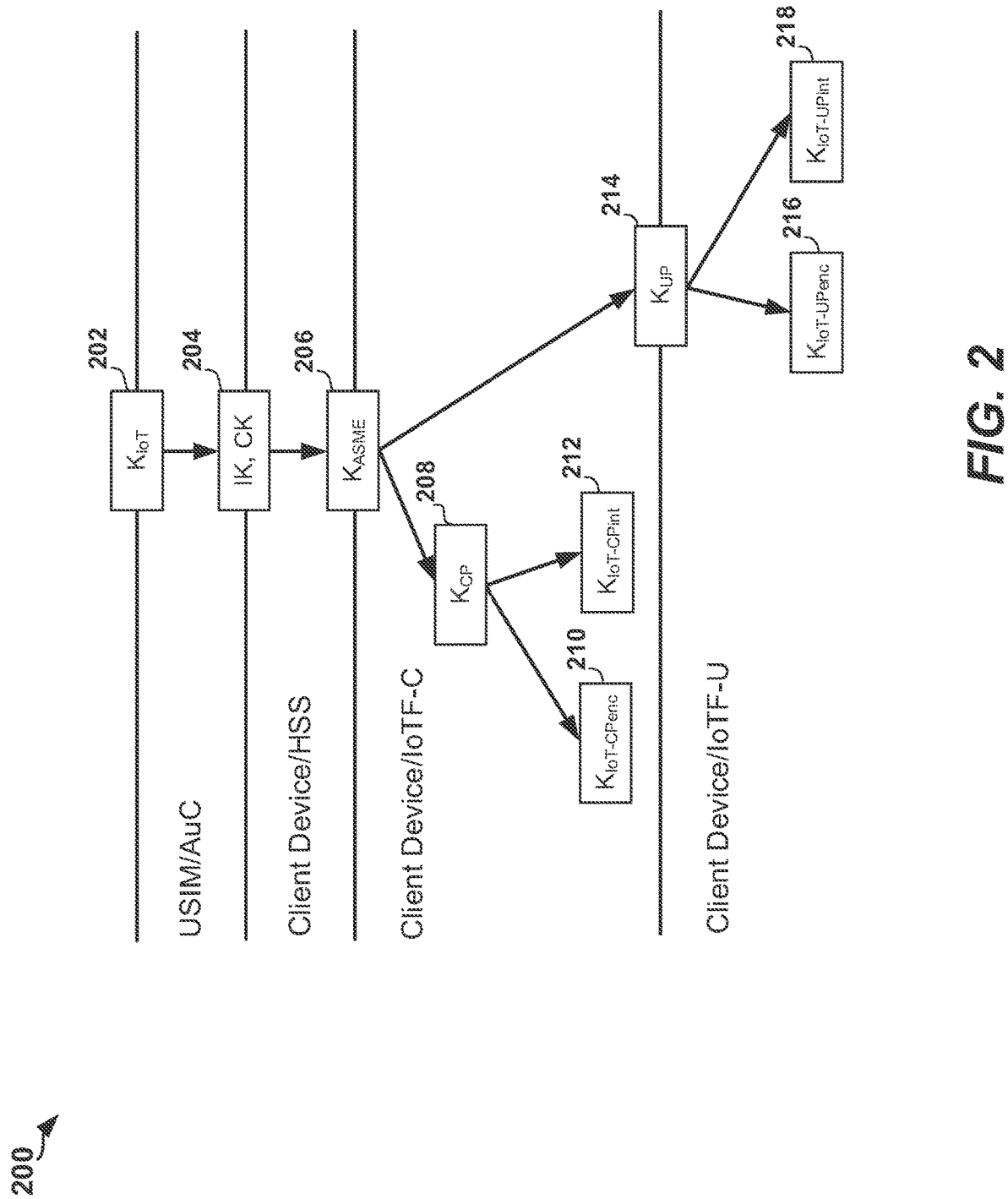
FIG. 2 is a diagram illustrating a key hierarchy for an IoT network architecture in accordance with various aspects of the present disclosure.

FIG. 2 is a diagram illustrating a key hierarchy 200 for an IoT network architecture (e.g., IoT network architecture 100) in accordance with various aspects of the present disclosure. In FIG. 2, the key $K_{IoT}$ 202 may be a secret key stored permanently in a Universal Mobile Telecommunications System (UMTS) Subscriber Identity Module (USIM) of a client device (e.g., the client device 102) and an Authentication Center (AuC)) of the network. The integrity key (IK) and cipher key (CK) (shown as IK, CK 204 in FIG. 2) are a pair of keys derived in the AuC and USIM during an AKA procedure. With reference to FIG. 1, during the AKA procedure, the IoTF-C 106 may receive authentication vectors (AVs) from the HSS/AAA server 112 which contain a key (shown in FIG. 2 as the key $K_{ASME}$ 206) from an Access Security Management Entity (ASME). The IoTF-C 106 may derive a control plane key ($K_{CP}$) 208 and a user plane key ($K_{UP}$) 214 from the key $K_{ASME}$ 206. The IoTF-C 106 may provide the key $K_{UP}$ 214 to the IoTF-U 108. The IoTF-C 106 may derive an encryption key $K_{IoT\text{-}CPenc}$ 210 and an integrity protection key $K_{IoT\text{-}CPint}$ 212 from the key $K_{CP}$ 208. The IoTF-U 108 may derive an encryption key $K_{IoT\text{-}UPenc}$ 216 and an integrity protection key $K_{IoT\text{-}UPint}$ 218 from the key $K_{UP}$ 214.

Figure 3:
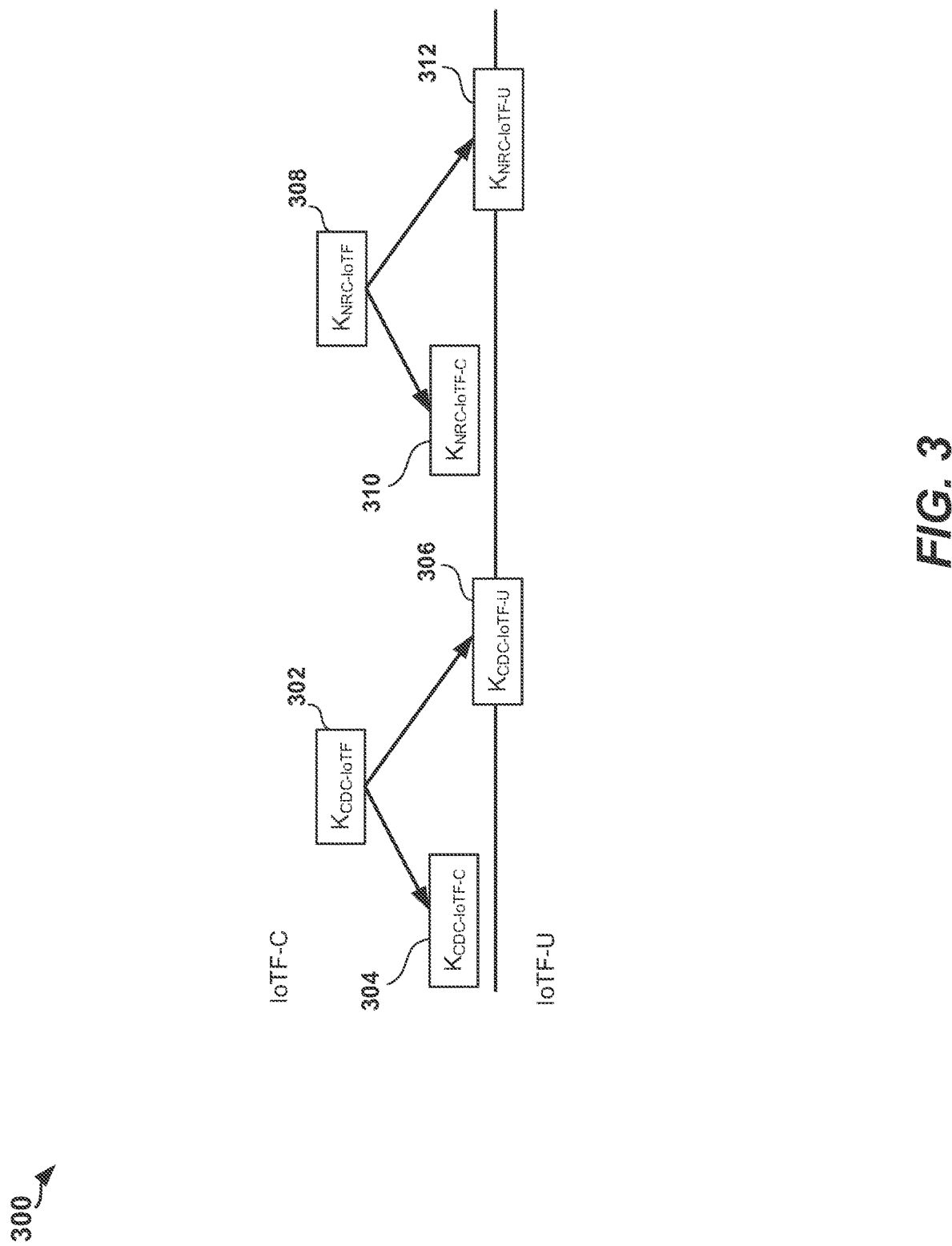
FIG. 3 is a diagram illustrating a key hierarchy for encrypting contexts in an IoT network architecture in accordance with various aspects of the present disclosure.

FIG. 3 is a diagram illustrating a key hierarchy 300 for encrypting contexts in an IoT network architecture (e.g., IoT network architecture 100) in accordance with various aspects of the present disclosure. In an aspect of the present disclosure, with reference to FIG. 1, the IoTF-C 106 may randomly generate a control plane client device context encryption key ($K_{CPc\text{-}IoTF\text{-}C}$) 304 and a user plane client device context encryption key ($K_{CPc\text{-}IoTF\text{-}U}$) 306 for a client device (e.g., client device 102) based on a context key $K_{CDC\text{-}IoTF}$ 302 for a client device. In an aspect of the present disclosure, with reference to FIG. 1, the IoTF-C 106 may randomly generate a network reachability context (NRC) encryption key ($K_{NRC\text{-}IoTF\text{-}C}$) 310 for the control plane based on a context key $K_{NRC\text{-}IoTF}$ 308. The IoTF-C 106 may further randomly generate a network reachability context (NRC) encryption key ($K_{NRC\text{-}IoTF\text{-}U}$) 312 for the user plane based on the context key $K_{NRC\text{-}IoTF}$ 308. In one aspect, the key $K_{NRC\text{-}IoTF\text{-}C}$ 310 and the key $K_{NRC\text{-}IoTF\text{-}U}$ 312 may be generated for an application service or a P-GW (e.g., P-GW 124).

Exemplary Network States of a Client Device

In a wireless communication system (e.g. an LTE network), network states are defined for a client device for mobility management (e.g., Evolved Packet System Mobility Management (EMM)). Such network states enable efficient communication between a client device and other entities in the network. In an aspect of the present disclosure, a client device (e.g., client device 102 in FIG. 1) may be in a deregistered state or a registered state.

For example, when the client device is in a deregistered state, the context for the client device may be stored in the HSS. The network holds no valid location or routing information for the client device, and the client device is not reachable.

As another example, the client device may enter a registered state by a successful registration with the network. In an aspect of the present disclosure, the client device may perform such registration by performing an attach procedure with the network. In the registered state, the client device has at least one active PDN connection. The client device also has an Evolved Packet System (EPS) security context set up. It should be noted that the deregistered and registered states assume that the client device has credentials (e.g., there is a subscription available in the HSS) for the network.

A wireless communication network (e.g., an LTE network) may further include network states defined for a client device for Evolved Packet System Connection Management (ECM). Accordingly, a client device (e.g., client device 102 in FIG. 1) in a registered state may be in one of two states (also referred to as sub-states of the registered state), such as an idle state or a connected state. In the idle state, no Non-Access-Stratum (NAS) signaling connection exists between the client device and the other network entities. In addition, the client device may perform cell selection/reselection and public land mobile network (PLMN) selection. There may be no context for the client device in the radio access network (e.g., network access node). Moreover, there may be no S1-MME and no S1-U connection for the client device in the idle state.

In the connected state, the location of the client device is known in the MME with an accuracy of a serving access network identifier (e.g., eNB identifier (ID), base station ID, or network access point ID). Mobility of the client device is handled by a handover procedure. Moreover, a signaling connection exists between the client device and the MME. The signaling connection may be made up of two parts: a radio resource control (RRC) connection and an S1-MME connection.

Figure 4:
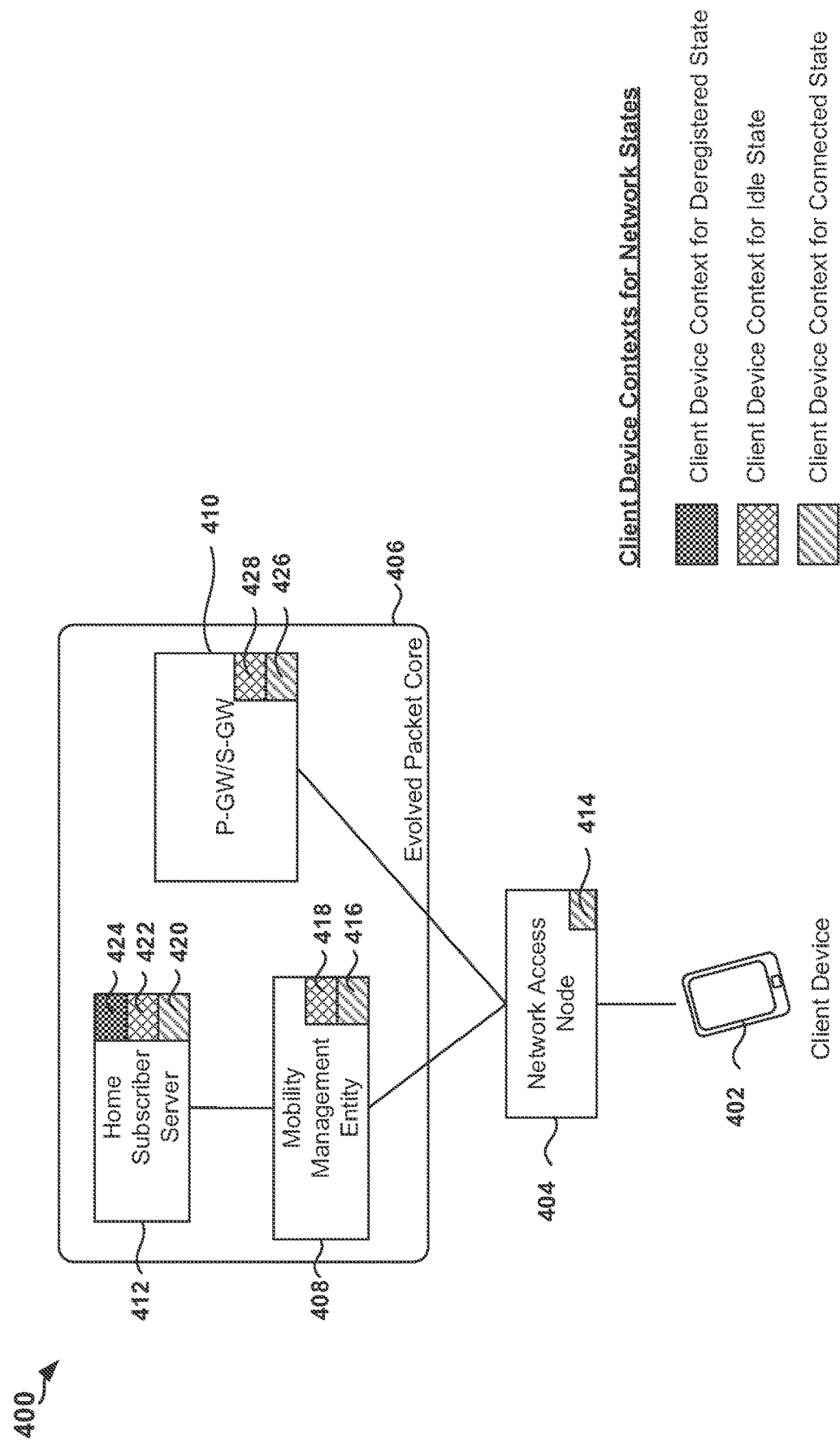
FIG. 4 is a diagram illustrating example network states of a client device maintained at various entities in a network.

FIG. 4 is a diagram illustrating example network states of a client device maintained at various entities in a network 400. As shown in FIG. 4, network 400 includes a client device 402, a network access node 404, and an Evolved Packet Core (EPC) 406. As further shown in FIG. 4, the EPC 406 includes a home subscriber server (HSS) 412, a mobility management entity (MME) 408, and a Packet Data Network Gateway (P-GW)/Serving Gateway (S-GW) 410. In an aspect of the present disclosure, the network 400 may be a 4G network. In other aspects, the network 400 may be a 3G network, an LTE network, a 5G network, or other appropriate network.

For example, with reference to FIG. 4, the network access node 404 may maintain a context 414 (also referred to as network state information) for the client device 402 when the client device 402 is in a connected state. The MME 408 may maintain a context 416 for the client device 402 when the client device 402 is in a connected state, and a context 418 for the client device 402 when the client device 402 is in an idle state. The P-GW/S-GW 410 may maintain a context 426 for the client device 402 when the client device 402 is in a connected state, and a context 428 for the client device 402 when the client device 402 is in an idle state. The HSS 412 may maintain a context 420 for the client device 402 when the client device 402 is in a connected state, a context 422 for the client device 402 when the client device 402 is in an idle state, and a context 424 for the client device 402 when the client device 402 is in a deregistered state. In an aspect of the present disclosure, if the network 400 is implemented as a 3G network, the P-GW/S-GW 410 may not maintain a context for the client device 402 when the client device 402 is in the idle state.

In an aspect of the present disclosure, an encrypted client device context may be generated for network functions, such as the IoTF-C 106 and IoTF-U 108 in FIG. 1, to enable opportunistic reconstruction of a context for a client device (also referred to as a client device context). For example, an encrypted client device context may enable a network entity to reconstruct a client device context while maintaining minimal to no network state information for the client device. Therefore, the encrypted client device context may enable a network entity to reconstruct a client device context without storing or caching any network state information. It should be noted that in the presence of potentially billions of client devices that transmit traffic infrequently, it is not desirable for network functions (e.g., the MME 408, the P-GW/S-GW 410) to maintain contexts (including security contexts) for client devices. Also, the encrypted client device context may eliminate signaling overhead at the network access node (e.g., eNB, base station, or network access point) during a handover or during transition from idle mode to connected mode. The encrypted client device context may be used to substantially reduce or eliminate signaling overhead since communication with an MME/controller may be avoided.

User Plane Encrypted Client Device Context

In an aspect of the present disclosure, a user plane (UP) encrypted client device context may be generated for a client device. For example, with reference to FIG. 1, the user plane encrypted client device context may be used at the IoTF-U 108 for uplink (UL) data transmissions. In an aspect of the present disclosure, the user plane encrypted client device context may include bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, and/or a security context (e.g., a selected encryption algorithm and a user-plane (UP) key 128). In other aspects, the user plane encrypted client device context may include other parameters, values, settings, or features that may be needed by the network to provide a service to the client device. In one example, the UP key 128 may be the key $K_{UP}$ 214, from which the key $K_{IoT\text{-}UPenc}$ 216 and the key $K_{IoT\text{-}UPint}$ 218 may be derived. The user plane encrypted client device context may be generated by encrypting a user plane context for the client device using a secret key of the IoTF-U 108, such as the key $K_{CDC\text{-}IoTF\text{-}U}$ 306 shown in FIG. 3. In an aspect of the present disclosure, the secret key of the IoTF-U 108, such as the key $K_{CDC\text{-}IoTF\text{-}U}$ 306, may be provisioned by IoTF-C 106. The user plane encrypted client device context may be decrypted by an IoTF that has the secret key (e.g., the key $K_{CPc\text{-}IoTF\text{-}U}$ 306). Accordingly, a user plane encrypted client device context may be decrypted by the IoTF that generated the user plane encrypted client device context.

Control Plane Encrypted Client Device Context

A control plane (CP) encrypted client device context may be generated by encrypting a control plane client device context for control messages (e.g., control packets or messages including control packets). In an aspect, the control plane encrypted client device context may include a client device identifier, the client device security context (e.g., control plane keys, such as the key $K_{IoT}$ ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. For example, with reference to FIG. 1, the control plane client device context for control messages may be encrypted with a secret key of the IoTF-C 106, such as key $K_{CDC\text{-}IoTF\text{-}C}$ 304 shown in FIG. 3. The control plane encrypted client device context may be decrypted by an IoTF that has the secret key (e.g., the key $K_{CPC\text{-}IoTF\text{-}C}$ 304). Accordingly, an encrypted client device context may be decrypted by the IoTF that generated the control plane encrypted client device context.

Encrypted Network Reachability Context

A network reachability context (NRC) for a client device may be encrypted (e.g., by an IoTF) to generate an encrypted network reachability context for downlink (DL) transmissions to the client device. The encrypted network reachability context enables an IoTF (e.g., IoTF-C 106, IoTF-U 108) to remove a client device context when the client device becomes idle. For example, with reference to FIG. 1, the encrypted network reachability context may be provided to the IoT server 122 or to the P-GW 124 that desires to communicate with the client device 102. Therefore, in this example, the IoT network architecture 100 does not need to maintain network state information for the client device 102 or may reduce the amount of network state information maintained for the client device 102. The IoT server 122 or the P-GW 124 may provide the encrypted network reachability context when it sends a DL data packet to the client device 102 to allow one or more nodes or entities (e.g., network access node 104) in the IoT network architecture 100 to reconstruct the network reachability context.

Encrypted network reachability context(s) may include one or more of the following features. In an aspect of the present disclosure, an encrypted network reachability context may provide a mobility feature by including an identifier for retrieving the network side network state information of the client device 102, a tracking area ID (TAI) list or equivalent to determine where to page the client device 102, and timing information (e.g., to determine when to page the client device 102). In an aspect of the present disclosure, an encrypted network reachability context may enable a context relocation procedure, such as a tracking area update (TAU) and optionally to obtain a new encrypted network reachability context and ID. In an aspect of the present disclosure, an encrypted network reachability context may include information extending beyond security and may indicate how security context is managed.

In an aspect of the present disclosure, the IoTF-C 106 provides information (e.g., a TAI list) to one or more entities in the service network 110 (e.g., IoT server 122 or P-GW 124). Such one or more entities in the service network 110 may then send the encrypted network reachability context to other entities in the IoT network architecture 100 to re-establish the context for the client device 102. The encrypted network reachability context(s) may be implemented for network initiated traffic. However, in some aspects involving client device initiated traffic or network initiated traffic, the IoTF 105 may maintain very limited to no network state information for the client device 102. In an aspect of the present disclosure, the IoTF-C 106 may provide the location of client device 102 in terms of at least a TAI list, which may be a portion of a network reachability context.

Initial Attach Procedure

Figure 5:
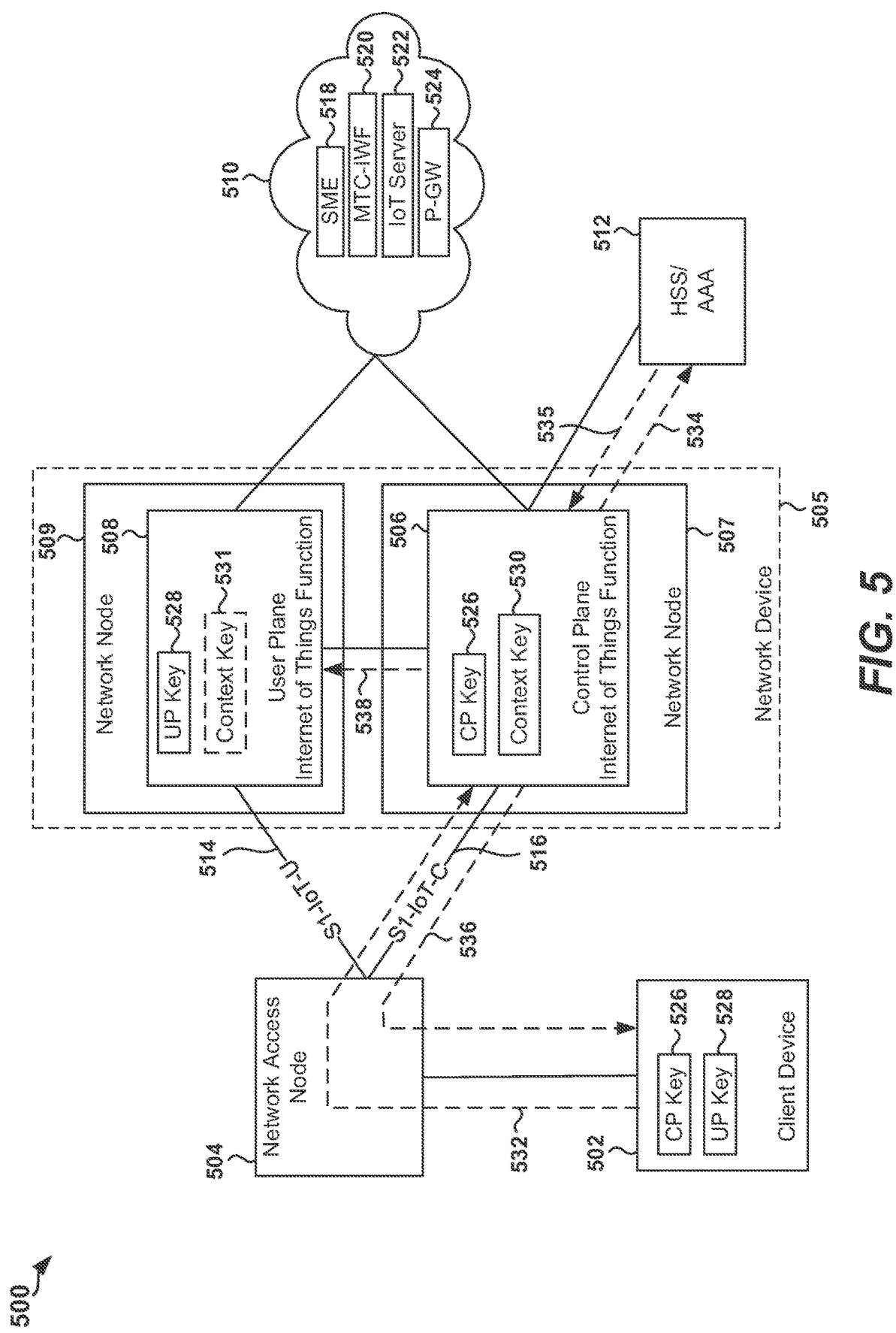
FIG. 5 is a block diagram illustrating an initial attach procedure by a client device in an IoT network architecture in accordance with various aspects of the present disclosure.

FIG. 5 is a block diagram illustrating an initial attach procedure by a client device in an IoT network architecture 500 in accordance with various aspects of the present disclosure. In some aspects, an attach procedure as described herein is also referred to as a network attachment procedure or a registration procedure.

As shown in FIG. 5, the IoT network architecture 500 includes a client device 502 (also referred to as an IoT device), a network access node 504 (e.g., eNB, base station, network access point), a network device 505, a service network 510, and a home subscriber server (HSS)/authentication, authorization, and accounting (AAA) server 512. In one aspect, the network device 505 may include one or more processing circuits and/or other appropriate hardware configured to implement an IoTF. For example, an IoTF may include a control plane IoT Function (IoTF-C) 506 and a user plane IoT Function (IoTF-U) 508. In such aspect, the IoTF-C 506 may be implemented at a first network node 507 and the IoTF-U 508 may be implemented at a second network node 509. In one aspect, the IoTF-C 506 and the IoTF-U 508 may be implemented at the same hardware platform, such that the IoTF-C 506 and the IoTF-U 508 each represent an independent node in the architecture 500. In such aspect, for example, the IoTF-C 506 may be implemented at a first virtual machine (e.g., a first operating system) provided on a hardware platform (e.g., the network device 505) and the IoTF-U 508 may be implemented at a second virtual machine (e.g., a second operating system) provided on the hardware platform.

As shown in FIG. 5, the IoTF-C 506 is in communication with the network access node 504 via a first S1 connection 516, and the IoTF-U 508 is in communication with the network access node 504 via a second S1 connection 514. In an aspect of the present disclosure, the service network 510 may include a number of entities, functions, gateways, and/or servers configured to provide various types of services. For example, the service network 510 may include a short message entity (SME) 518, a machine type communication interworking function (MTC-IWF) 520, an IoT server 522, and/or a packet data network (PDN) gateway (P-GW) 524. It should be understood that the service network 510 disclosed in FIG. 5 serves as one example and that in other aspects, the service network 510 may include different types of entities, functions, and/or servers than those disclosed in FIG. 5.

As shown in FIG. 5, the client device 502 may transmit an attach request 532 to the network, which may be received by the network access node 504. In an aspect of the present disclosure, the attach request 532 may indicate that the client device 502 is to attach as an IoT device (e.g., or indicate a request to perform small (reduced) data transfer, or indicate that the client device is operating in a low power consumption mode) and may indicate the home domain (e.g., HPLMN ID or fully qualified domain name (FQDN)) from which the authentication information should be retrieved. The network access node 504 may forward the request to the IoTF-C 506 to which it belongs.

The IoTF-C 506 may determine the address of the HSS/AAA server 512 from the home domain information provided by the client device 502 and may transmit a request 534 for authentication information for the client device 502 to the HSS/AAA server 512. The IoTF-C 506 may receive the authentication information 535 from the HSS/AAA server 512.

The IoTF-C 506 may perform mutual authentication (e.g., an AKA procedure) with the client device 502. During the AKA procedure, the IoTF-C 506 may receive AVs from the HSS/AAA server 512 through the authentication information 535. For example, the AVs may contain a key (shown in FIG. 2 as the key $K_{ASME}$ 206) from an Access Security Management Entity (ASME). For example, the IoTF-C 506 may provide the key $K_{ASME}$ 206 to the client device 502 through the signal 536. When the AKA procedure is completed, the IoTF-C 506 and the client device 502 may derive CP key(s) 526, such as the key $K_{CP}$ 208, the key $K_{IoT-CPenc}$ 210 and/or the key $K_{IoT-CPint}$ 212, and may derive UP key(s) 528, such as the key $K_{UP}$ 214, the key $K_{IoT-UPenc}$ 216 and/or the key $K_{IoT-UPint}$ 218, from the key $K_{ASME}$ 206 or from the key $K_{IoT}$ 202. In some aspects, the IoTF-C 506 may transfer the key $K_{UP}$ 214 and the user plane encryption and integrity protection keys, such as the key $K_{IoT-UPenc}$ 216 and the key $K_{IoT-UPint}$ 218, to the IoTF-U 508 via the message 538.

In an aspect of the present disclosure, the IoTF-C 506 may generate one or more encrypted client device contexts for the client device 502 by using the context key 530 to encrypt a client device context. The IoTF-C 506 may then transmit the one or more encrypted client device contexts to the client device 502. For example, the IoTF-C 506 may generate an encrypted client device context for the control plane and an encrypted client device context for the user plane. In such example, the context key 530 may include a first context key (e.g., the key $K_{CDC-IoTF-C}$ 304) for generating an encrypted client device context for the control plane and a second context key (e.g., the key $K_{CDC-IoTF-U}$ 306) for generating an encrypted client device context for the user plane. In an aspect of the present disclosure, the IoTF-C 506 may provide one or more of the context key(s) 530 to the IoTF-U 508. For example, the IoTF-C 506 may transmit the second context key (e.g., the key $K_{CDC-IoTF-U}$ 306) for generating the encrypted client device context for the user plane to the IoTF-U 508 via the message 538. Accordingly, in some aspects, the IoTF-U 508 may include context key(s) 531 provided by the IoTF-C 506.

In an aspect of the present disclosure, the IoTF-C 506 may generate one or more encrypted network reachability contexts for transmitting downlink (DL) traffic to the client device 502 using the context key 530 to encrypt a network reachability context. The IoTF-C 506 may then transmit the one or more encrypted network reachability contexts to a network entity such as the IoT server 522 or P-GW 524. Example approaches for generating one or more encrypted network reachability contexts are discussed in detail herein. The IoTF-C 506 may send the key $K_{UP}$ 214, user plane encryption and integrity protection keys (e.g., the key $K_{IoT-UPenc}$ 216 and the key $K_{IoT-UPint}$ 218), and a network reachability context (NRC) encryption key for the user plane (e.g., the key $K_{NRC-IoTF-U}$ 312), to the IoTF-U 508 via the message 538. Accordingly, in some aspects, the IoTF-U 508 may include context key(s) 531 (e.g., the key $K_{NRC-IoTF-U}$ 312) provided by the IoTF-C 506.

Figure 6:
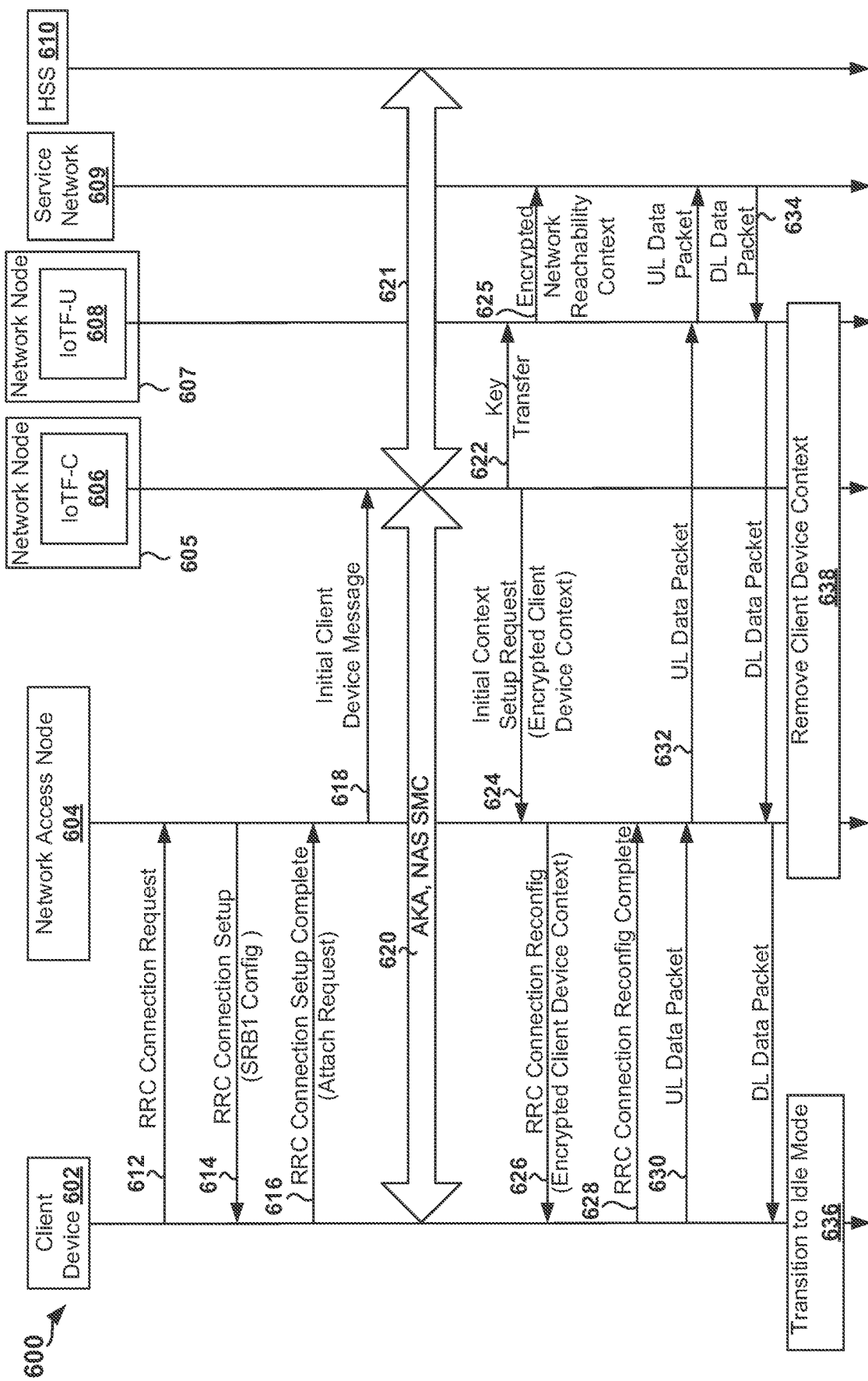
FIG. 6 is a signal flow diagram of an exemplary attach procedure by a client device in an IoT network architecture in accordance with various aspects of the present disclosure.

FIG. 6 is a signal flow diagram 600 of an exemplary attach procedure by a client device in an IoT network architecture (e.g., IoT network architecture 100, 500) in accordance with various aspects of the present disclosure. As shown in FIG. 6, the signal flow diagram 600 includes a client device 602 (also referred to as an IoT device), a network access node 604 (e.g., eNB, base station, or network access point), an IoTF-C 606 implemented at a network node 605, an IoTF-U 608 implemented at a network node 607, a service network 609, and a home subscriber server (HSS) 610. As shown in FIG. 6, the client device 602 may transmit a request 612 (e.g., an RRC connection request) to the network access node 604 in order to communicate with the network. The client device 602 may receive an RRC connection setup message 614, which may include a signaling radio bearer (SRB) configuration (e.g., an SRB1 configuration for transmitting NAS messages over a dedicated control channel (DCCH)). The client device 602 may transmit an RRC connection setup complete message 616 to the network access node 604. For example, the RRC connection setup complete message 616 may indicate an attach request. The network access node 604 may transmit an initial client device message 618 to the IoTF-C 606. The IoTF-C 606 may determine the address of the HSS server 610 from the home domain information provided by the client device 602, and may communicate 621 with the HSS 610. For example, the IoTF-C 606 may transmit a request for authentication information for the client device 602 to the HSS server 610 and may receive the authentication information from the HSS server 610.

As shown in FIG. 6, the IoTF-C 606 may perform mutual authentication, such as an AKA procedure 620, with the client device 602. When the AKA procedure 620 is completed, the IoTF-C 606 and the client device 602 may derive control plane keys, such as the key $K_{IoT\text{-}CPenc}$ 210 and/or key $K_{IoT\text{-}CPint}$ 212, from the key $K_{ASME}$ 206 or from the key $K_{IoT}$ 202. The IoTF-C 606 and the client device 602 may further derive user plane keys, such as the key $K_{IoT\text{-}UPenc}$ 216 and/or the key $K_{IoT\text{-}UPint}$ 218, from the key $K_{ASME}$ 206 or from the key $K_{IoT}$ 202. In an aspect of the present disclosure, the IoTF-C 606 may generate a control plane encrypted client device context by encrypting a control plane context for the client device 602 using the key $K_{CPC\text{-}IoTF\text{-}C}$ 304 and/or may generate a user plane encrypted client device context by encrypting a user plane context for the client device 602 using the key $K_{CDC\text{-}IoTF\text{-}U}$ 306. The IoTF-C 606 may transfer one or more keys (e.g., user plane keys, such as the key $K_{IoT\text{-}UPenc}$ 216 and/or the key $K_{IoT\text{-}UPint}$ 218, and/or the key 306) to the IoTF-U 608 via the message 622.

The IoTF-C 606 may transmit an initial context set up request message 624 with an encrypted client device context (e.g., a control plane encrypted client device context and/or user plane encrypted client device context) to the client device 602. Therefore, the encrypted client device context may include a client device context associated with the IoTF-C 606 and/or IoTF-U 608 of the IoTF, where the client device context may be used for uplink data transmission by the client device 602. In an aspect of the present disclosure, the encryption key is only known to an IoTF (e.g., the client device security context may be retrieved exclusively by the IoTF-C 606 and/or IoTF-U 608 of the IoTF). Accordingly, in such aspect, the encryption key may be the $K_{CPC}$-IoTF-U 306, which may be unknown to network entities outside of the IoTF 606, such as the network access node 604 or the client device 602. In an aspect of the present disclosure, each encrypted client device context corresponds to one data radio bearer (DRB).

In an aspect of the present disclosure, the IoTF-C 606 may transmit a message 625 including an encrypted network reachability context to the service network 609. In an aspect of the present disclosure, the IoTF-C 606 may generate a control plane (CP) encrypted network reachability context by encrypting a control plane context for the client device 602 using the key $K_{NRC\text{-}IoTF\text{-}C}$ 310 and/or may generate a user plane (UP) encrypted network reachability context for the client device 602 by encrypting a user plane context for the client device 602 using the key $K_{NRC\text{-}IoTF\text{-}U}$ 312. Therefore, in one example, the IoTF-C 606 may transmit the message 625 including an encrypted network reachability context (e.g., a CP encrypted network reachability context and/or a UP encrypted network reachability context) to the service network 609. Therefore, the encrypted network reachability context may include a client device context (e.g., network state information) associated with the IoTF-C 606 and/or IoTF-U 608 of the IoTF, where such client device context may be used for downlink (DL) data transmission from the network (e.g., from an entity in the service network 609) to the client device 602. In an aspect of the present disclosure, the encryption key is only known to IoTFs (e.g., may be retrieved exclusively by the IoTF-C 606 and/or IoTF-U 608 of the IoTF). In an aspect of the present disclosure, the IoTF-C 608 may allocate encrypted network reachability contexts to a network entity, such as an IoT server or a P-GW in the service network 609.

The network access node 604 may transmit an RRC connection reconfiguration message 626 to the client device 602. In an aspect of the present disclosure, the RRC connection reconfiguration message 626 may include the encrypted client device context. The client device 602 may transmit an RRC connection reconfiguration complete message 628 to the network access node 604. The client device 602 may transmit a first message 630 including a data packet (e.g., a UL data packet) to the network access node 604. The network access node 604 may forward the data packet to the service network 609 via the second message 632. The service network 609 may transmit a third message 634 including a data packet (e.g., a DL data packet) to the client device 602. For example, and as shown in FIG. 6, the third message 634 may be forwarded to the client device 602 by the IoTF-U 608 and the network access node 604. The client device 602 may then transition 636 to the idle mode. The network access node 604, the IoTF-C 606, and the IoTF-U 608 may proceed to remove 638 the client device context.

IoT UL Data Transfer

Figure 7:
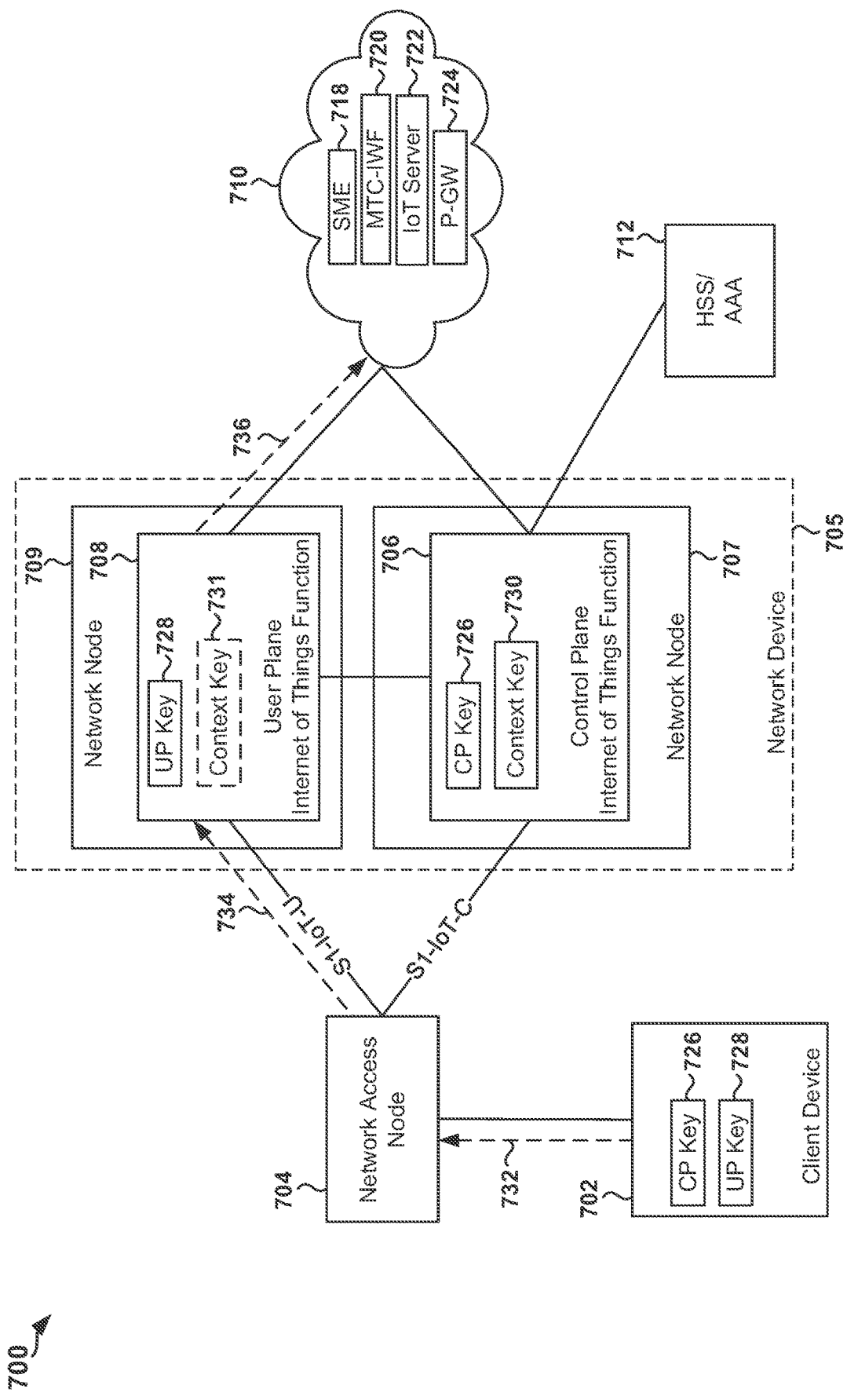
FIG. 7 is a block diagram illustrating a data transmission initiated by a client device in an IoT network architecture in accordance with various aspects of the present disclosure.

FIG. 7 is a block diagram illustrating a data transmission initiated by a client device in an IoT network architecture 700 in accordance with various aspects of the present disclosure. As shown in FIG. 7, the IoT network architecture 700 includes a client device 702 (also referred to as an IoT device), a network access node 704 (e.g., eNB, base station, network access point), a network device 705, a service network 710, and a home subscriber server (HSS)/authentication, authorization, and accounting (AAA) server 712. In one aspect, the network device 705 may include one or more processing circuits and/or other appropriate hardware configured to implement an IoTF. For example, an IoTF may include a control plane IoT Function (IoTF-C) 706 and a user plane IoT Function (IoTF-U) 708. In such aspect, the IoTF-C 706 may be implemented at a network node 707 and the IoTF-U 708 may be implemented at a network node 709. In one aspect, the IoTF-C 706 and the IoTF-U 708 may be implemented at the same hardware platform, such that the IoTF-C 706 and the IoTF-U 708 each represent an independent node in the architecture 700. In such aspect, for example, the IoTF-C 706 may be implemented at a first virtual machine (e.g., a first operating system) provided on a hardware platform (e.g., the network device 705) and the IoTF-U 708 may be implemented at a second virtual machine (e.g., a second operating system) provided on the hardware platform.

In an aspect of the present disclosure, the service network 710 may include a number of entities, functions, gateways, and/or servers configured to provide various types of services. For example, the service network 710 may include a short message entity (SME) 718, a machine type communication interworking function (MTC-IWF) 720, an IoT server 722, and/or a packet data network (PDN) gateway (P-GW) 724. It should be understood that the service network 710 disclosed in FIG. 7 serves as one example and that in other aspects, the service network 710 may include different types of entities, functions, and/or servers than those disclosed in FIG. 7.

In the aspect of FIG. 7, the IoTF-C 706 may have generated an encrypted client device context for the control plane and an encrypted client device context for the user plane. In such aspect, the context key(s) 730 may include a first context key (e.g., the key $K_{CDC\text{-}IoTF\text{-}C}$ 304) for generating an encrypted client device context for the control plane and a second context key (e.g., the key $K_{CDC\text{-}IoTF\text{-}U}$ 306) for generating an encrypted client device context for the user plane. For example, the IoTF-C 706 may have transmitted the second context key (e.g., the key $K_{CDc-IoTF-U}$ 306) for generating the encrypted client device context for the user plane to the IoTF-U 708. Accordingly, in such example, the IoTF-U 708 may include the context key(s) 731 provided by the IoTF-C 706 as shown in FIG. 7. In the aspect of FIG. 7, the client device 702 has derived CP key(s) 726 and UP key(s) 728 in a manner previously discussed.

In the aspect of FIG. 7, the IoTF-C 706 may have generated an encrypted network reachability context for the control plane and an encrypted network reachability context for the user plane. In such aspect, the context key(s) 730 may include a first context key (e.g., the key $K_{NRC-IoTF-C}$ 310) for generating an encrypted network reachability context for the control plane and a second context key (e.g., the key $K_{NRC-IoTF-U}$ 312) for generating an encrypted network reachability context for the user plane. For example, the IoTF-C 706 may have transmitted the second context key (e.g., the key $K_{NRC-IoTF-U}$ 312) for generating the encrypted network reachability context for the user plane to the IoTF-U 708. Accordingly, in such example, the IoTF-U 708 may include the context key(s) 731 provided by the IoTF-C 706 as shown in FIG. 7.

As shown in FIG. 7, the client device 702 may transmit a first message 732 including a data packet and an encrypted client device context provided by the IoTF-C 706 to the network access node 704. The data packet in the first message 732 may be encrypted and integrity protected based on the user plane (UP) keys 728. The network access node 704 may determine the address of the IoTF-U 708 from the IoTF-U identifier in the data packet and may forward the data packet to the IoTF-U 708 via a second message 734. In an aspect, the network access node 704 may forward the data packet to the next hop node (e.g., the IoTF-U 708) indicated by the client device 702 without verifying the packet. The IoTF-U 708 may verify the encrypted client device context and may decrypt the encrypted client device context using the context key(s) 731 (e.g., the key $K_{CDC-IoTF-U}$ 306 for generating the encrypted client device context for the user plane). The IoTF-U 708 may reconstruct the client device context based on the decrypted information. The IoTF-U 708 may then decrypt and verify the data packet with the encryption and integrity keys (e.g., UP key(s) 728). In an aspect of the present disclosure, the IoTF-U 708 may generate an encrypted network reachability context based on the context (e.g., network state information) of the client device 702. The IoTF-U 708 may forward the data packet via a third message 736 to the next hop (e.g., the IoT server 722 or the P-GW 724) with the encrypted network reachability context. In an aspect of the present disclosure, initial data transfer by the client device 702 immediately following an attach procedure may not carry the encrypted client device context.

Figure 8:
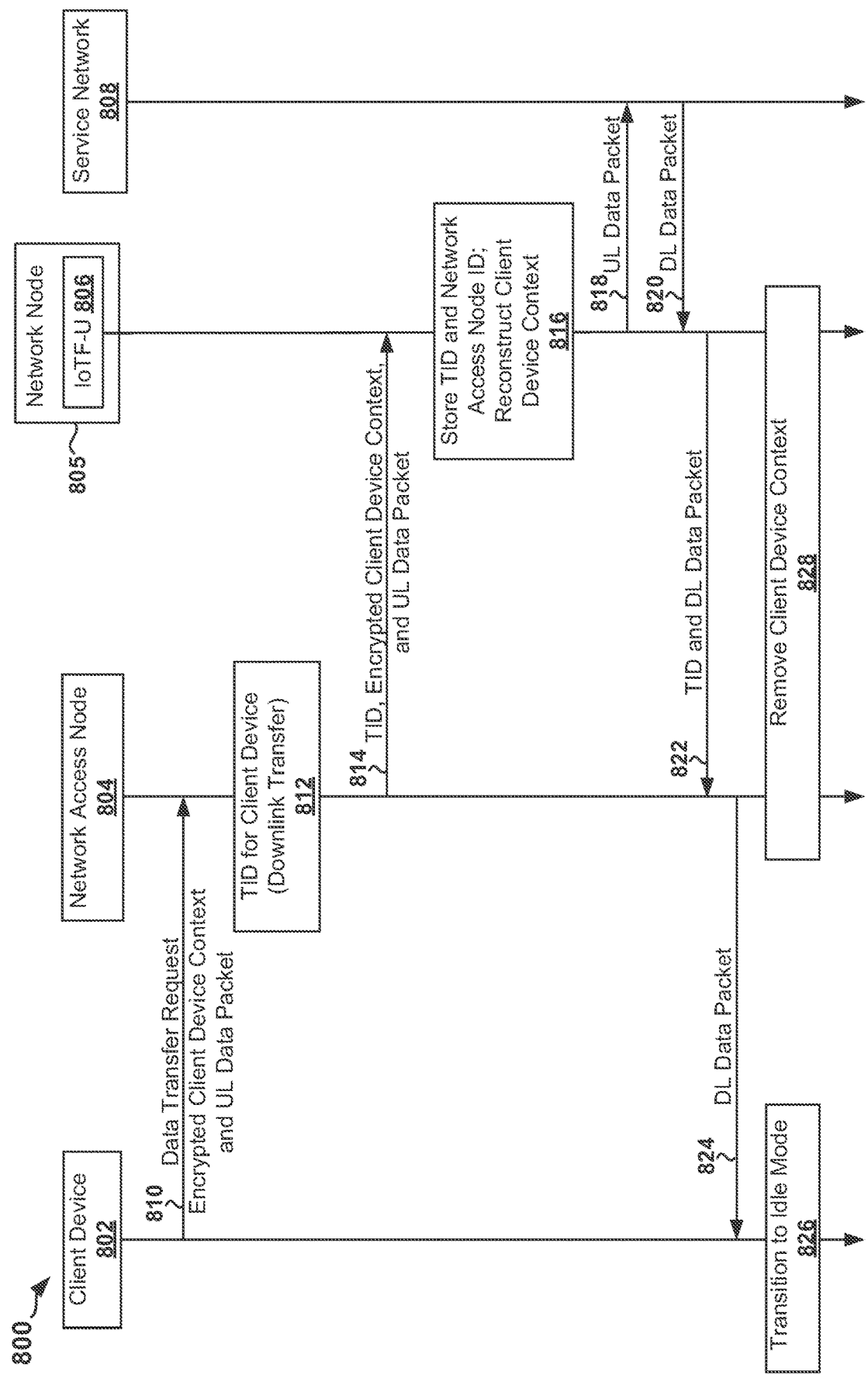
FIG. 8 is a signal flow diagram illustrating an exemplary data transmission initiated by a client device in an IoT network architecture in accordance with various aspects of the present disclosure.

FIG. 8 is a signal flow diagram 800 illustrating an exemplary data transmission initiated by a client device in an IoT network architecture (e.g., IoT network architecture 700) in accordance with various aspects of the present disclosure. As shown in FIG. 8, the signal flow diagram 800 includes a client device 802 (also referred to as an IoT device), a network access node 804 (e.g., eNB, base station, or network access point), an IoTF-U 806 implemented at a network node 805, and a service network 808. The client device 802 may transmit a data transfer request message 810 that includes an encrypted client device context and a data packet (e.g., a UL data packet) to the network access node 804. The data packet may be encrypted and integrity protected based on the previously discussed user plane keys (e.g., the key $K_{IoT-UPenc}$ 216 and/or the key $K_{IoT-UPint}$ 218). In as aspect, the data transfer request message 810 may be sent by the client device 802 without establishing an RRC connection with the network access node 804. The network access node 804, upon receipt of the data transfer request message 810, may assign 812 a temporary identifier (TID) for the client device 802 for potential downlink (DL) traffic. For example, the TID may be a cell radio network temporary identifier (C-RNTI). The network access node 804 may determine the IoTF-U identifier included in the header of the data packet. An example format of the data packet including such header is discussed herein with reference to FIG. 12. The network access node 804 may determine the IP address of the IoTF-U 806, and may forward the data packet to the IoTF-U 806 via a first message 814. For example, as part of the Operations and Maintenance (OAM) procedures, the network access node 804 may be configured with a set of IoTF-U identifiers and the corresponding IP address, or alternatively, the network access node 804 may use a domain name system (DNS) query based on the IoTF-U ID to determine the IP address of the IoTF-U 806. In an aspect of the present disclosure, and as shown in FIG. 8, the network access node 804 may include the TID and the encrypted client device context along with the data packet in the first message 814. In an aspect of the present disclosure, the TID is stored at the network access node 804 for a predefined time interval. In such aspect, the network access node 804 may transmit the TID expiration time to IoTF-U 806 along with the TID in the first message 814. The IoTF-U 806 may decrypt the encrypted client device context and may reconstruct 816 the client device context (e.g., S5 bearer). In an aspect, the IoTF-U 806 may then decrypt and verify the data packet with the encryption and integrity keys (e.g., UP key(s) 728).

The IoTF-U 806 may forward the data packet to the service network 808 (e.g., the P-GW in service network 808 or other entity in the service network 808) via a second message 818. In response to the uplink data (e.g., the UL data packet in the second message 818), the IoTF-U 806 may receive a data packet (e.g., a DL data packet) from the service network 808 (e.g., the P-GW in the service network 808 or a corresponding entity in the service network 808) via the third message 820. The IoTF-U 806 may determine one or more keys associated with the client device 802 (e.g., the user plane key(s) 728). For example, the IoTF-U 806 may encrypt and integrity protect the data packet for the client device with the keys $K_{IoT-UPenc}$ 216 and/or the key $K_{IoT-UPint}$ 218 associated with the client device 802. The IoTF-U 806 may transmit the received data packet to the network access node 804 with the TID in a fourth message 822. The network access node 804 may identify the client device 802 using the TID and may transmit the data packet to the client device 802 in a fifth message 824. The client device 802 may transition 826 to the idle mode based on a pre-configured timer. The network access node 804 and the IoTF-U 806 may proceed to remove 828 the client device context that was created on-the-fly from the encrypted client device context.

Client Device Terminated Data Transfer

Figure 9:
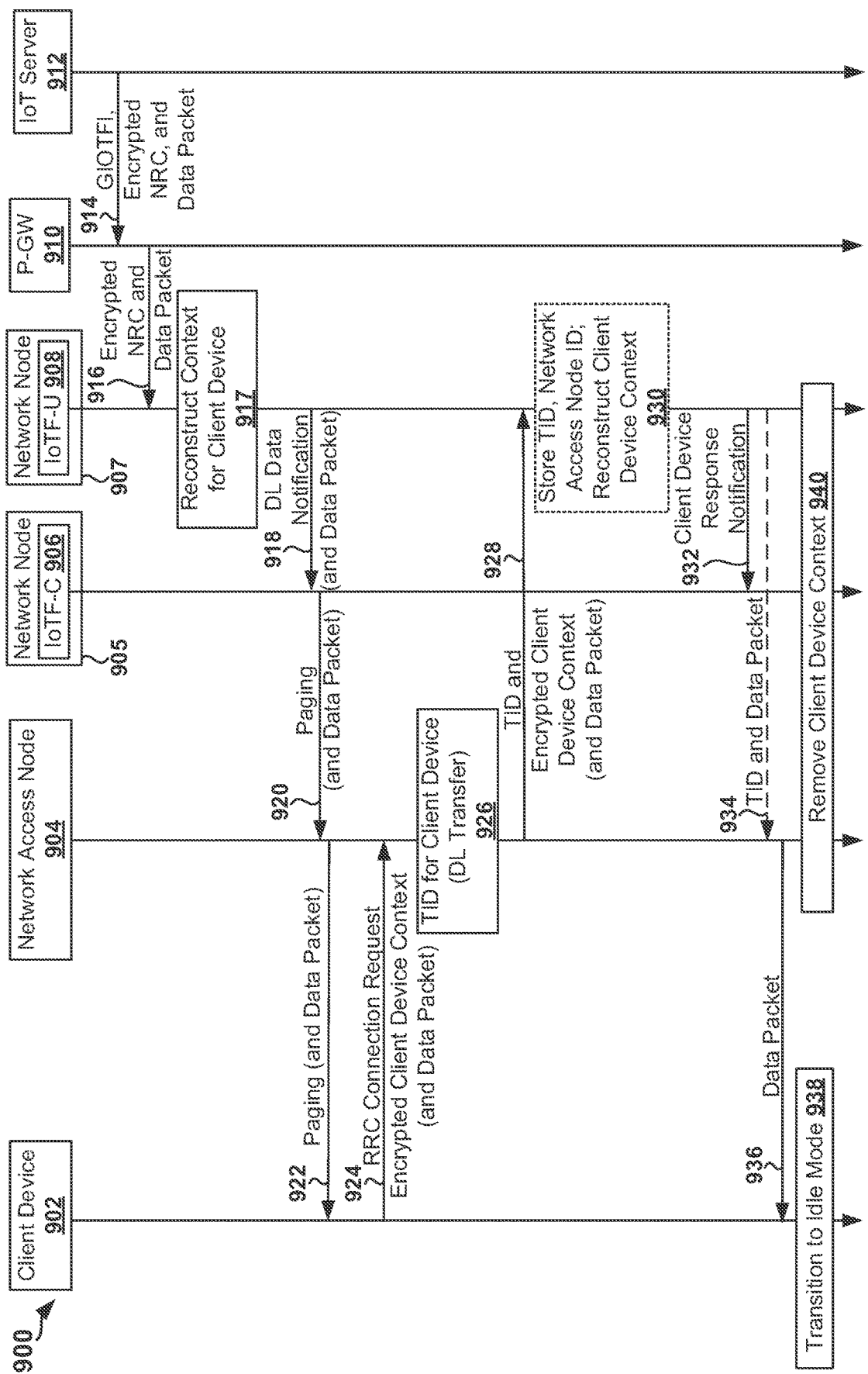
FIG. 9 is a signal flow diagram of an exemplary client device terminated data transmission in an IoT network architecture in accordance with various aspects of the present disclosure.

FIG. 9 is a signal flow diagram 900 of an exemplary client device terminated data transmission in an IoT network architecture (e.g., IoT network architecture 100) in accordance with various aspects of the present disclosure. As shown in FIG. 9, the signal flow diagram 900 includes a client device 902 (also referred to as an IoT device), a network access node 904 (e.g., eNB, base station, network access point), an IoTF-C 906 implemented at a network node 905 and an IoTF-U 908 implemented at a network node 907, a P-GW 910, and an IoT server 912.

The IoT server 912 may transmit a downlink (DL) message 914 including a DL data packet, a global IoTF identifier (GIOTFI), and an encrypted network reachability context (NRC) to the P-GW 910. The P-GW 910 may locate the IoTF-U 908 based on the GIOTFI and may forward the DL data packet to the IoTF-U 908 in a forward message 916. In an aspect of the present disclosure, the IoTF-U 908 may verify the encrypted network reachability context. As shown in FIG. 9, the IoTF-U 908 may reconstruct 917 the context for the client device 902. For example, the IoTF-U 908 may reconstruct the context for the client device 902 by decrypting the encrypted network reachability context using a context key (e.g., the key $K_{NRC\text{-}IoTF\text{-}U}$ 312) stored at the IoTF-U 908.

The IoTF-U 908 may transmit a DL data notification message 918 to the IoTF-C 906. In an aspect of the present disclosure, the DL data notification message 918 may include the DL data packet if the DL data packet is small enough to be carried in a paging message. The IoTF-C 906 may transmit a paging message 920 to one or more network access nodes (e.g., network access node 904). The network access node 904 may then page the client device 902 by transmitting the page message 922.

The client device 902 may transmit an RRC connection request message 924 including a UL data packet to the IoTF-U 908. In an aspect of the present disclosure, the UL data packet transmitted by the client device 902 may be empty. The network access node 904 may assign 926 a temporary identifier (TID) for the client device 902 for potential downlink (DL) traffic. For example, the TID may be a cell radio network temporary identifier (C-RNTI). The network access node 904 may then forward the UL data packet with the TID and encrypted client device context to the IoTF-U 908 in a forward message 928. The IoTF-U 908 may store 930 the TID and ID of the network access node 904.

The IoTF-U 908 may transmit a client device response notification message 932 to the IoTF-C 906. In an aspect of the present disclosure, the IoTF-U 908 may transmit, to the client device 902, a message 934 including a DL data packet and the TID for the client device 902 if the IoTF-U 908 was not able to include the DL data packet in the DL data notification message 918. The network access node 904 may forward the DL data packet to the client device 902 in a forward message 936. The client device 902 may then transition 938 to the idle mode. The network access node 904 and IoTF-C 906 may remove 940 the client device context.

Control Plane Protocol Stack

Figure 10:
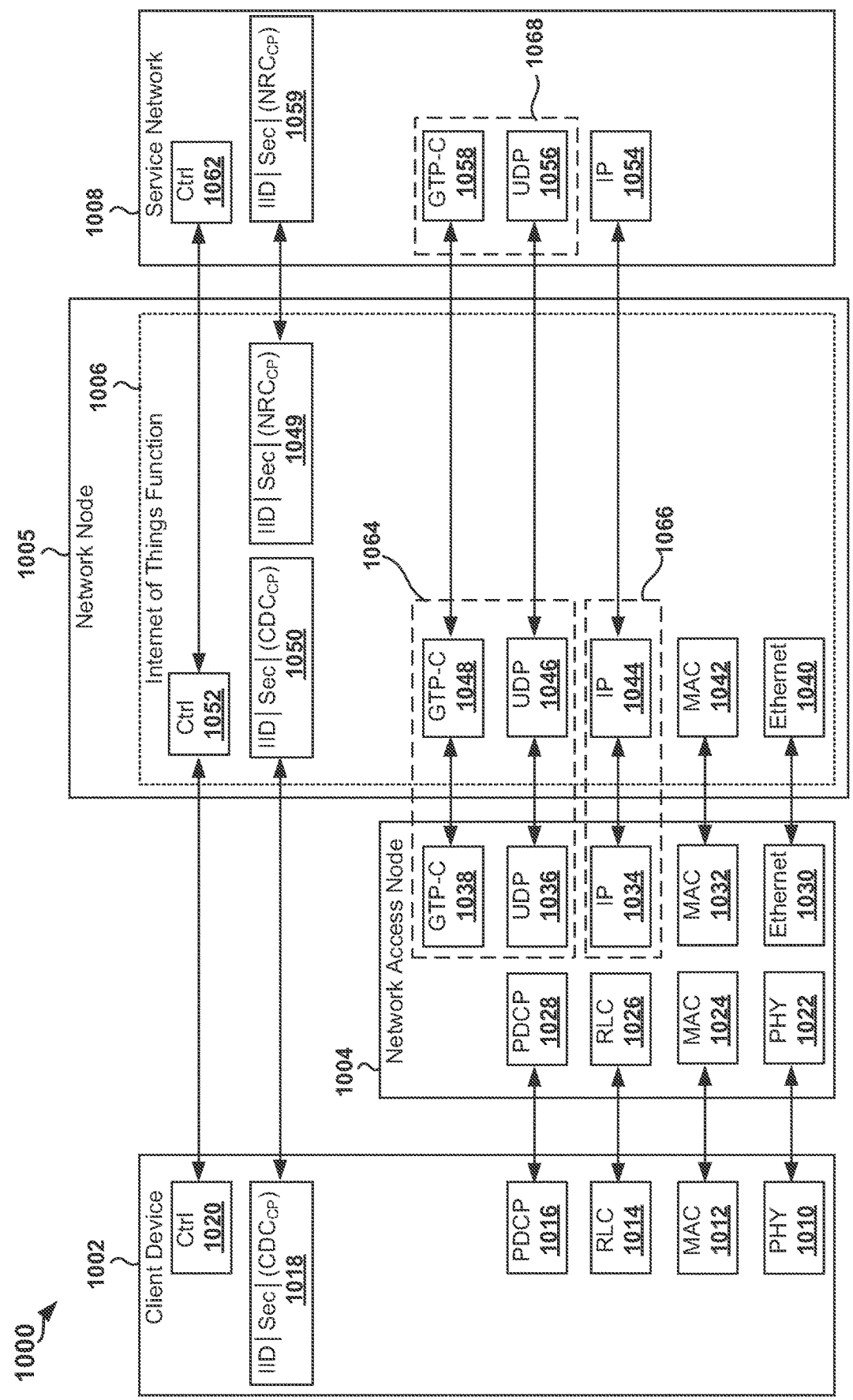
FIG. 10 is a diagram illustrating a control plane protocol stack for IoT data transmission in accordance with various aspects of the present disclosure.

FIG. 10 is a diagram illustrating a control plane protocol stack 1000 for IoT data transmission in accordance with various aspects of the present disclosure. As shown in FIG. 10, the protocol stack 1000 may include a client device protocol stack 1002 (also referred to as an IoT device protocol stack), a network access node protocol stack 1004, an IoTF protocol stack 1006 implemented at a network node 1005, and a service network protocol stack 1008. For example, the network access node protocol stack 1004 may be implemented in an eNB, base station, or network access point. As another example, service network protocol stack 1008 may be implemented in a P-GW. As shown in FIG. 10, the client device protocol stack 1002 may include a physical (PHY) layer 1010, a media access control (MAC) layer 1012, a radio link control (RLC) layer 1014, a packet data convergence protocol (PDCP) layer 1016, and a control (Ctrl) layer 1020. As further shown in FIG. 10, the client device protocol stack 1002 may implement a context protocol layer 1018 for communicating a control plane encrypted client device context (abbreviated as "$CDC_{CP}$" in FIG. 10). The context protocol layer 1018 may further enable communication of an IoTF ID (IID) and/or a security header (abbreviated as "Sec" in FIG. 10) that indicates the presence of an encrypted client device context.

As shown in FIG. 10, the network access node protocol stack 1004 may include a PHY layer 1022, a MAC layer 1024, an RLC layer 1026, and a PDCP layer 1028 that respectively interface with the PHY layer 1010, the MAC layer 1012, the RLC layer 1014, and the PDCP layer 1016 of the client device protocol stack 1002. The network access node protocol stack 1004 may further include an Ethernet layer 1030, a MAC layer 1032, an Internet Protocol (IP) layer 1034, a user datagram protocol (UDP) layer 1036, and a control plane GPRS Tunneling Protocol (GTP-C) layer 1038.

As shown in FIG. 10, the IoTF protocol stack 1006 may include an Ethernet layer 1040, a MAC layer 1042, an IP layer 1044, a UDP layer 1046, a GTP-C layer 1048, and a control (Ctrl) layer 1052. As further shown in FIG. 10, the IoTF protocol stack 1006 may implement a context protocol layer 1050 for communicating a control plane encrypted client device context (abbreviated as "$CDC_{CP}$" in FIG. 10). The context protocol layer 1050 may also enable communication of an IoTF ID (IID) and/or a security header (abbreviated as "Sec" in FIG. 10) that indicates the presence of an encrypted client device context. As shown in FIG. 10, the context protocol layer 1018 of the client device protocol stack 1002 is in communication with the context protocol layer 1050 of the IoTF protocol stack 1006. In an aspect, an encrypted client device context may be carried in a packet header outside a UP message in accordance with the exemplary packet format described with respect to FIG. 12. As further shown in FIG. 10, the IoTF protocol stack 1006 may further implement a context protocol layer 1049 for communicating a control plane encrypted network reachability context (abbreviated as "$NRC_{CP}$" in FIG. 10). The context protocol layer 1049 may also enable communication of an IoTF ID (IID) and/or a security header (abbreviated as "Sec" in FIG. 10) that indicates the presence of an encrypted network reachability context.

The service network protocol stack 1008 may include an IP layer 1054, a UDP layer 1056, a GTP-C layer 1058, and a Ctrl layer 1062 that respectively interface with the IP layer 1044, the UDP layer 1046, the GTP-C layer 1048 and the Ctrl layer 1052 of the IoTF protocol stack 1006. As further shown in FIG. 10, the service network protocol stack 1008 may implement a context protocol layer 1059 for communicating a control plane encrypted network reachability context (abbreviated as "$NRC_{CP}$" in FIG. 10). The context protocol layer 1059 may also enable communication of an IoTF ID (IID) and/or a security header (abbreviated as "Sec" in FIG. 10) that indicates the presence of an encrypted network reachability context. As shown in FIG. 10, the context protocol layer 1059 of the service network protocol stack 1008 is in communication with the context protocol layer 1049 of the IoTF protocol stack 1006. In an aspect of the present disclosure, an encrypted network reachability context may be carried in a packet header outside a user plane message in accordance with the exemplary packet format described with respect to FIG. 13. In an aspect of the present disclosure, if a network architecture is implemented as a GSM EDGE Radio Access Network (GERAN), protocols different than the IP protocols 1066 may be used. In an aspect of the present disclosure, the GTP-C and UDP protocols indicated by regions 1064 and 1068 may be omitted.

User Plane Protocol Stack

Figure 11:
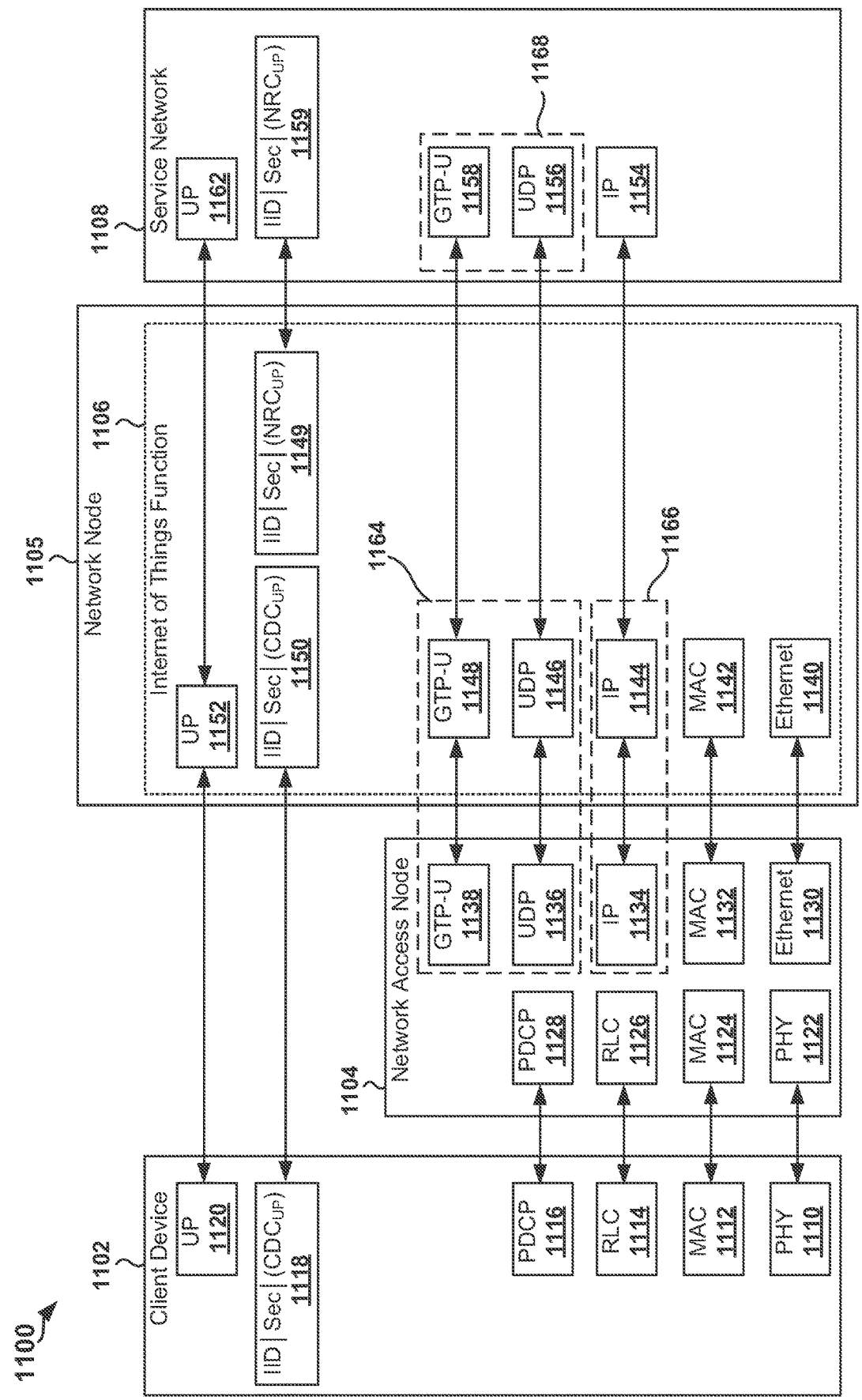
FIG. 11 is a diagram illustrating a user plane protocol stack for IoT data transmission in accordance with various aspects of the present disclosure.

FIG. 11 is a diagram illustrating a user plane protocol stack 1100 for IoT data transmission in accordance with various aspects of the present disclosure. As shown in FIG. 11, the protocol stack 1100 may include a client device protocol stack 1102 (also referred to as an IoT device protocol stack), a network access node protocol stack 1104, an IoTF protocol stack 1106 implemented at a network node 1105, and a service network protocol stack 1108. For example, the network access node protocol stack 1104 may be implemented in an eNB, base station, or network access point. As another example, the service network protocol stack 1108 may be implemented in a P-GW. As shown in FIG. 11, the client device protocol stack 1102 may include a physical (PHY) layer 1110, a media access control (MAC) layer 1112, a radio link control (RLC) layer 1114, a packet data convergence protocol (PDCP) layer 1116, and a user plane (UP) layer 1120. As further shown in FIG. 11, the client device protocol stack 1102 may implement a context protocol layer 1118 for communicating a user plane encrypted client device context (abbreviated as "$CDC_{UP}$" in FIG. 11). The context protocol layer 1118 may further enable communication of an IoTF ID (IID) and/or a security header (abbreviated as "Sec" in FIG. 101) that indicates the presence of an encrypted client device context.

As shown in FIG. 11, the network access node protocol stack 1104 may include a PHY layer 1122, a MAC layer 1124, an RLC layer 1126, and a PDCP layer 1128 that respectively interface with the PHY layer 1110, the MAC layer 1112, the RLC layer 1114, and the PDCP layer 1116 of the client device protocol stack 1102. The network access node protocol stack 1104 may further include an Ethernet layer 1130, a MAC layer 1132, an Internet Protocol (IP) layer 1134, a user datagram protocol (UDP) layer 1136, and a user plane GPRS Tunneling Protocol (GTP-U) layer 1138.

As shown in FIG. 11, the IoTF protocol stack 1106 may include an Ethernet layer 1140, a MAC layer 1142, an IP layer 1144, a UDP layer 1146, and a GTP-U layer 1148. As further shown in FIG. 11, the IoTF protocol stack 1106 may implement a context protocol layer 1150 for communicating a user plane encrypted client device context (abbreviated as "$CDC_{UP}$" in FIG. 11). The context protocol layer 1150 may also enable communication of an IoTF ID (IID) and/or a security header (abbreviated as "Sec" in FIG. 11) that indicates the presence of an encrypted client device context. As shown in FIG. 11, the context protocol layer 1118 of the client device protocol stack 1102 is in communication with the context protocol layer 1150 of the IoTF protocol stack 1106. In an aspect, a user plane encrypted client device context may be carried in a packet header outside a UP message in accordance with the exemplary packet format described with respect to FIG. 12. As further shown in FIG. 11, the IoTF protocol stack 1106 may further implement a context protocol layer 1149 for communicating a user plane encrypted network reachability context (abbreviated as "$NRC_{UP}$" in FIG. 11). The context protocol layer 1149 may also enable communication of an IoTF ID (IID) and/or a security header (abbreviated as "Sec" in FIG. 11) that indicates the presence of an encrypted network reachability context.

The service network protocol stack 1108 may include an IP layer 1154, a UDP layer 1156, a GTP-U layer 1158 and a UP layer 1162 that respectively interface with the IP layer 1144, the UDP layer 1146, the GTP-U layer 1148, and the UP layer 1152 of the IoTF protocol stack 1106. The service network protocol stack 1108 may implement a context protocol layer 1159 for communicating a user plane encrypted network reachability context (abbreviated as "$NRC_{UP}$" in FIG. 11). As shown in FIG. 11, the context protocol layer 1159 of the service network protocol stack 1108 is in communication with the context protocol layer 1149 of the IoTF protocol stack 1106. In an aspect of the present disclosure, a user plane encrypted network reachability context may be carried in a packet header outside a UP message in accordance with the exemplary packet format described with respect to FIG. 11. In an aspect of the present disclosure, if a network architecture is implemented as a GSM EDGE Radio Access Network (GERAN), protocols different than the IP protocols 1166 may be used. In an aspect of the present disclosure, the GTP-U and UDP protocols indicated by regions 1164 and 1168 may be omitted. In an aspect of the present disclosure, if the IP protocol is used for UP message delivery, the user plane encrypted network reachability context may be carried in the IP options field (IPv4) or IP extension header (IPv6).

IoT Packet Format

Figure 12:
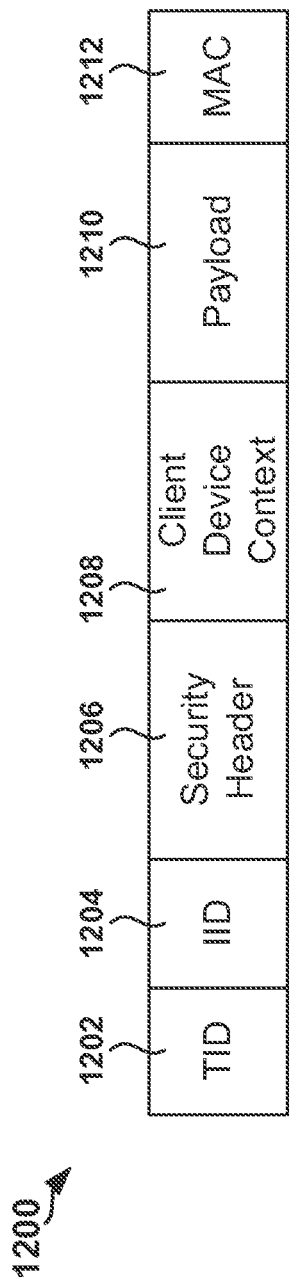
FIG. 12 is a diagram of a packet format for transmissions in an IoT network architecture in accordance with various aspects of the present disclosure.

FIG. 12 is a diagram of a packet format 1200 for transmissions in an IoT network architecture in accordance with various aspects of the present disclosure. With reference to FIG. 12, the temporary identifier (TID) field 1202 may be used by a network access node (e.g., eNB, base station, or network access point) to identify a client device (also referred to as an IoT device) locally. For example, the value assigned by a network access node to the TID field 1202 for identifying a client device may be a C-RNTI or equivalent. In an aspect of the present disclosure, the IoTF ID (IID) field 1204 may include a globally unique temporary identifier (GUTI). For example, the GUTI may include an identifier associated with an IoTF and an identifier (e.g., a temporary identifier, such as a mobility management entity (MME) temporary mobile subscriber identity (M-TMSI)) associated with the client device. For example, the GUTI may be used by a network access node to identify an IoTF, and the GUTI may be used by an IoTF to identify a client device. In another aspect, the IID field 1204 may include a global IoTF identifier (GIOTFI) and an identifier (e.g., a temporary identifier, such as an M-TMSI) associated with the client device. For example, the GIOTFI may be an equivalent of a globally unique mobility management entity identifier (GUMMEI) for an IoTF. In an aspect of the present disclosure, the M-TMSI may be encrypted for client device privacy. It should be noted that using the IoTF IP address may disclose the network topology.

The security header field 1206 may indicate the presence of an encrypted client device context, a control plane (CP)/user plane (UP) indication, a sequence number, a time stamp value and/or a random value. For example, the time stamp value may be based on a time and a counter, where the time is the network access node time or IoTF time. The client device context field 1208 may include an encrypted client device context. It should be noted that if a time stamp is used for encryption instead of the sequence number, the IoTF may not need to maintain any client device network states. In an aspect, a random value may be based on a random number and a counter. The random value may be generated by the network access node or by the client device, or a combination thereof. The counter may be incremented by a certain value (e.g., one) for each packet. If a random value is used for encryption instead of the sequence number, the client device may generate a new encryption key based on the encryption key in the security context and the random number. If a random value is used for integrity protection instead of the sequence number, the client device may generate a new integrity protection key based on the integrity protection key in the security context and the random number, and may protect a message using the new integrity protection key. The payload field 1210 may include data or control information (e.g., a data packet or a control packet).

The message authentication code (MAC) field 1212 may be used for integrity protection. For example, the MAC field 1212 may include a message authentication code generated by a transmitting device or entity. The message authentication code in the MAC field 1212 may then be used by a receiving device or entity to verify that the integrity of the message has not been compromised (e.g., that the contents of the message have not been altered or manipulated). In one aspect, the message authentication code in the MAC field 1212 may be generated at a transmitting device or entity by applying a message authentication code generation algorithm (e.g., an AEAD cihper), where a message (e.g., a packet) and a user plane key or a control plane key are used as inputs for the message authentication code generation algorithm. The output of the message authentication code generation algorithm may be the message authentication code included in the MAC field 1212. A receiving device or entity may verify the integrity of the received message by applying the message authentication code generation algorithm (e.g., the AEAD cihper) to the message. For example, the received message (e.g., the packet) and the user plane key or the control plane key may be used as inputs for the message authentication code generation algorithm. The receiving device or entity may then compare the output of the message authentication code generation algorithm to the message authentication code included in the MAC field 1212. In such example, when the output of the message authentication code generation algorithm matches the message authentication code included in the MAC field 1212, the receiving device or entity may determine that the message has been successfully verified.

Figure 13:
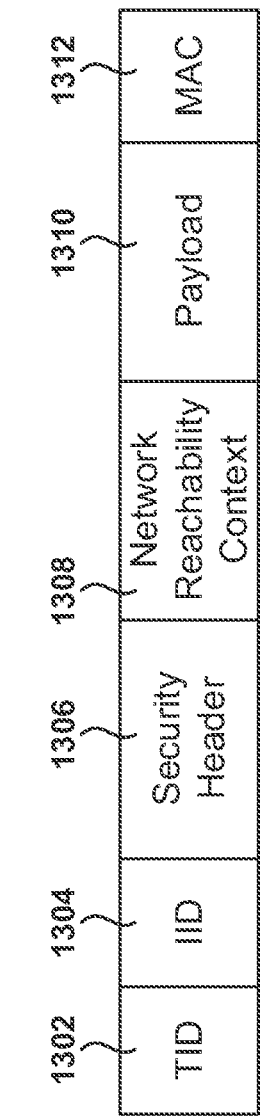
FIG. 13 is a diagram of a packet format for transmissions in an IoT network architecture in accordance with various aspects of the present disclosure.

FIG. 13 is a diagram of a packet format 1300 for transmissions in an IoT network architecture in accordance with various aspects of the present disclosure. With reference to FIG. 13, the temporary identifier (TID) field 1302 may be used by a network access node (e.g., eNB, base station, or network access point) to identify a client device (also referred to as an IoT device) locally. For example, the value assigned by a network access node to the TID field 1302 for identifying a client device may be a C-RNTI or equivalent. In an aspect of the present disclosure, the IoTF ID (IID) field 1304 may include a globally unique temporary identifier (GUTI) or a global IoTF identifier (GIOTFI). For example, the GUTI may be used by a network access node to identify an IoTF, and the GUTI may be used by an IoTF to identify a client device. For example, the GIOTFI may be an equivalent of a globally unique mobility management entity identifier (GUMMEI) for an IoTF. In an aspect of the present disclosure, a mobility management entity (MME) temporary mobile subscriber identity (M-TMSI) may be encrypted for client device privacy. It should be noted that using the IoTF IP address may disclose the network topology. The security header field 1306 may indicate the presence of an encrypted network reachability context, a CP/UP indication, a sequence number, and/or or a time stamp value. For example, the time stamp value may be based on a time and a counter, where the time is the network access node time or IoTF time. The network reachability context field 1308 may include an encrypted network reachability context. The payload field 1310 may include data or control information (e.g., a data packet or a control packet). The message authentication code (MAC) field 1312 may be used for integrity protection (e.g., an AEAD cipher may be used). It should be noted that if a time stamp is used for encryption instead of the sequence number, the IoTF may not need to maintain any network state information for a client device.

Encrypted Client Device Context Design and Generation

In an aspect of the present disclosure, the encrypted client device context may contain the client device context established during an AKA procedure. For example, the client device context may include a security context, a bearer ID, Evolved Packet System (EPS) bearer quality of service(s) (QoS) and S5-TEID(s), and/or other services, parameters, values, settings, or features that may be needed by the network to provide a service to the client device.

In some aspects, the encrypted client device context may include one or more items of information in addition to the client device context. For example, the encrypted client device context may include an expiration time set by IoTF-C 106 (or indicated in the client device context), which limits the lifetime of the encrypted client device context (e.g., to prevent permanent reuse). As another example, the encrypted client device context may have a key index that identifies the key used for generating the encrypted client device context.

In some aspects, the encrypted client device context may be generated using a secret key that is only known to an entity in the network and, therefore, may not be interpreted and/or modified by client devices. For example, the encrypted client device context may be generated by encrypting a client device context using the secret key of the IoTF-U (e.g., IoTF-U 108). In some aspects, the encrypted client device context may be integrity protected with the secret key of the IoTF-U (e.g., IoTF-U 108) and, therefore, may not be manipulated/modified by client devices.

In an aspect, the encrypted client device context may be provided to a client device (e.g., client device 102) by the IoTF-C (e.g., IoTF-C 106) as a successful completion of authentication and context (e.g., bearer) setup. In an aspect, a client device may include the encrypted client device context in one or more user plane packets (e.g., UL data packets) to enable the IoTF-U (e.g., IoTF-U 108) to reconstruct the client device context on-the-fly. For example, if a client device needs to transmit multiple packets in series, the client device may include the encrypted client device context in the first packet without including the encrypted client device context in subsequent packets. In some aspects, the encrypted client device context may be specific to a client device and, therefore, an encrypted client device context issued to a client device may not be used by any other client devices.

a) Control Plane Encrypted Client Device Context

In an aspect of the present disclosure, an IoTF (e.g., IoTF-C 106 in FIG. 1) may generate an encrypted client device context by concatenating one or more items of information. For example, a control plane (CP) encrypted client device context ($CDC_{CP}$) may be generated based on the expression KeyID∥Enc_$K_{CDC\text{-}IoTF\text{-}C}$ ($CDC_{CP}$)∥MAC. In an aspect of the present disclosure, the key $K_{CPc\text{-}IoTF\text{-}C}$ (e.g., the key $K_{CDC\text{-}IoTF\text{-}C}$ 304 in FIG. 3) may be the same as the key $K_{CDC\text{-}IoTF}$ (e.g., the key $K_{CDC\text{-}IoTF}$ 302 in FIG. 3) or derived from the key $K_{CDC\text{-}IoTF}$. The term KeyID may represent the Key Index (used for generating the encrypted client device context).

The term $CDC_{CP}$ may represent the control plane client device context. For example, the control plane client device context may include a client device identifier, the client device security context (e.g., control plane keys, such as the key $K_{IoT}$ ($K_{ASME}$ equivalent), the key $K_{IoT-CPenc}$ 210, the key $K_{IoT-CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{CDC-IoTF-C}$ ($CDC_{CP}$) may represent the result of an encryption operation performed on the control plane client device context using the key $K_{CDC-IoTF-C}$.

b) User Plane Encrypted Client Device Context

As another example, a user plane (UP) encrypted client device context ($CDC_{UP}$) may be generated based on the expression KeyID||Enc_$K_{CDC-IoTF-U}$ ($CDC_{UP}$)||MAC. The term $CDC_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT-UPenc}$ 216, the key $K_{IoT-UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term Enc_$K_{CDC-IoTF-U}$ ($CDC_{UP}$) may represent the result of an encryption operation performed on the user plane client device context using the key $K_{CDC-IoTF-U}$. In an aspect of the present disclosure, the encrypted client device context may only be decrypted by the IoTF (e.g., IoTF-C 106 and/or IoTF-U 108) to which the client device is attached/associated. In an aspect of the present disclosure, a client device context may be compressed before being encrypted.

The encrypted client device context may have one or more characteristics. For example, an encrypted client device context may contain the network state information associated with a particular client device and, therefore, may not be transferrable to other client devices. An IoTF-C/U (e.g., the IoTF-C 106 and/or the IoTF-U 108) may not maintain contexts (e.g., network state information) of a client device. Accordingly, such IoTF-C/U may recover a client device context from an encrypted client device context using its own secret key and, therefore, the IoTF-C/U may not need to store any additional information to recover a client device context. The IoTF-C/U may remove a client device context under certain conditions (e.g., Evolved Packet System Connection Management (ECM)-Idle or immediately after small data transfer) and restore it when necessary (e.g., for data transfer).

A client device may store encrypted client device contexts provided by an IoTF-C for fast UL data transfer/fast control plane message transfer. The client device may enter a sleep mode immediately after transmitting one or more data packet(s). Since there may be no message exchange overhead for an IoTF-U to reconstruct a client device context, no delay may be experienced for transmission of small data packets. In an aspect of the present disclosure, no control plane message may be used for user plane data transmission when the client device is in the idle mode.

Encrypted Network Reachability Context Design and Generation a) Control Plane Encrypted Network Reachability Context In an aspect of the present disclosure, an encrypted network reachability context may be generated by concatenating one or more items of information. For example, a control plane (CP) encrypted network reachability context may be generated based on the expression KeyI||Enc_$K_{NRC-IoTF-C}$($CDC_{CP}$)||MAC. In an aspect of the present disclosure, the key $K_{NRC-IoTF-C}$ (e.g., the key $K_{NRC-IoTF-C}$ 310 in FIG. 3) may be the same as the key $K_{NRC-IoTF}$ (e.g., the key $K_{NRC-IoTF}$ 308 in FIG. 3) or may be derived from the key $K_{NRC-IoTF}$. The term KeyID may represent the Key Index (used for generating the network reachability context). The term $CDC_{CP}$ may represent the control plane client device context. For example, the control plane client device context may include a client device identifier, the client device security context (e.g., control plane keys, such as the key $K_{IoT}$ 202 ($K_{ASME}$ equivalent), the key $K_{IoT-CPenc}$ 210, the key $K_{IOT-CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{NRC-IoTF\_C}$($CDC_{CP}$) may represent the result of an encryption operation performed on the control plane client device context using the key $K_{NRC-IoTF-C}$ (e.g., the key $K_{NRC-IoTF-C}$ 310 in FIG. 3).

b) User Plane Encrypted Network Reachability Context

As another example, a user plane (UP) encrypted network reachability context may be generated based on the expression KeyID||Enc_$K_{NRC-IoTF-U}$($CDC_{UP}$)||MAC. The term $CDC_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT-UPenc}$ 216, the key $K_{IoT-UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term Enc_$K_{NRC-IoTF-U}$($CDC_{UP}$) may represent the result of an encryption operation performed on the user plane client device context using the key $K_{NRC-IoTF-U}$ (e.g., the key $K_{NRC-IoTF-U}$ 312 in FIG. 3). In an aspect of the present disclosure, the encrypted network reachability context may only be decrypted by the IoTF (e.g., IoTF-C 106 and/or IoTF-U 108) to which the client device is attached/associated. In an aspect of the present disclosure, the network reachability context may be compressed prior to encryption.

The encrypted network reachability context may have one or more characteristics. For example, an encrypted network reachability context may contain the network state information associated with a particular client device and, therefore, may not be transferrable to other client devices. An IoTF-C/U (e.g., the IoTF-C 106 and/or the IoTF-U 108) may not maintain contexts (e.g., network state information) of a client device. Accordingly, such IoTF-C/U may reconstruct a network reachability context for a client device by decrypting an encrypted network reachability context using its own secret key and, therefore, the IoTF-C/U does not need to store any additional information to recover a network reachability context. The IoTF-C/U may remove a network reachability context for a client device under certain conditions (e.g., Evolved Packet System Connection Management (ECM)-Idle or immediately after small data transfer) and restore it when necessary (e.g., for data transfer).

Tracking Area Update Procedure

A client device may perform a tracking area update (TAU) procedure when the client device enters into a new tracking area during the idle mode. The TAU message may include the current tracking area ID (TAI) and the GIOTFI or equivalent (e.g., a globally unique mobile management entity identifier (GUMMEI)) of the source IoTF-C. The target IoTF-C may update the location of the client device and the mobility anchor (e.g., IoTF-U ID) to one or more network entities (e.g., a P-GW) along with an encrypted network reachability context. In an aspect of the present disclosure, the encrypted network reachability context may enable the IoTF-U to verify the downlink packet. In an aspect of the present disclosure, an application server (e.g., an IoT server) and/or a P-GW may transmit a downlink (DL) packet with the encrypted network reachability context to the IoTF-U/C (identified by the GIOTFI).

Figure 14:
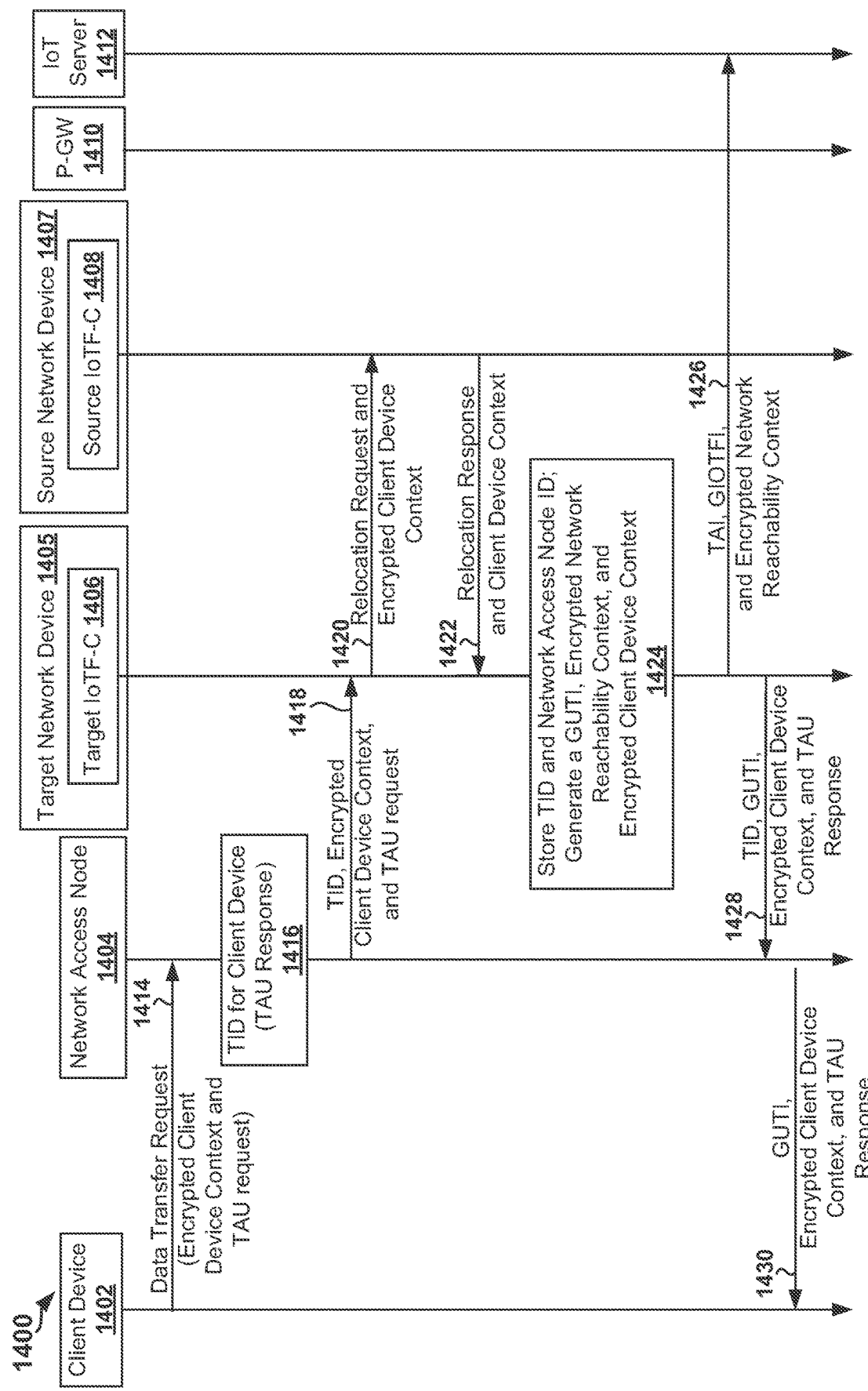
FIG. 14 is a signal flow diagram of a tracking area update (TAU) procedure in an IoT network architecture in accordance with various aspects of the present disclosure.

FIG. 14 is a signal flow diagram 1400 of a TAU procedure in an IoT network architecture (e.g., IoT network architecture 100) in accordance with various aspects of the present disclosure. As shown in FIG. 14, the signal flow diagram 1400 includes a client device 1402 (also referred to as an IoT device), a network access node 1404 (e.g., eNB, base station, network access point), a target IoTF-C 1406 implemented at a target network device 1405, a source IoTF-C 1408 implemented at a source network device 1407, a P-GW 1410, and an IoT server 1412 (also referred to as an application server). The client device 1402 may transmit a data transfer request message 1414 that includes an encrypted client device context (e.g., a control plane (CP) encrypted client device context) and a TAU request to the network access node 1404. In an aspect of the present disclosure, the data transfer request message 1414 may be sent by the client device 1402 without establishing an RRC connection. The network access node 1404, upon receipt of the data transfer request message 1414, may assign 1416 a temporary identifier (TID) for the client device 1402 for potential downlink (DL) traffic. The network access node 1404 may further determine the target IoTF-C identifier included in the TAU request. The network access node 1404 may then determine the IP address of the target IoTF-C 1406, and may transmit a message 1418 including the TID associated with the client device 1402, the encrypted client device context, and the TAU request to the target IoTF-C 1406. The target IoTF-C 1406 may transmit a message 1420 including a request for the client device context and the encrypted client device context to the source IoTF-C 1408.

The source IoTF-C 1408 may verify the encrypted client device context and may transmit a message 1422 including the client device context to the target IoTF-C 1406. The target IoTF-C 1406 may store 1424 the TID for client device and the ID for the network access node 1404, and may generate 1424 a new GUTI, a new encrypted network reachability context for the client device 1402, and a new encrypted client device context for the client device 1402 based on the received client device context. In an aspect, the target IoTF-C 1406 may generate user plane (UP) keys and context generation keys and may provide the keys to an IoTF-U.

The target IoTF-C 1406 may transmit a message 1426 including the tracking area ID (TAI), the ID of the target IoTF-C 1406 (e.g., GIOTFI), and the new encrypted network reachability context to the IoT server 1412 (or P-GW 1410). The target IoTF-C 1406 may transmit a message 1428 including the TID, the new GUTI, the new encrypted client device context, and the TAU response to the client device 1402. The network access node 1404 may forward the new GUTI, the new client device context, and the TAU response to the client device 1402 in a message 1430 based on the TID (e.g., to the client device 1402 identified using the TID).

The aspects described herein provide an architecture with new dedicated network functions that enable independent deployment and that avoid scalability/inter-working requirements. The aspects disclosed herein may enable a network access node (e.g., a base station) to transfer data to or from client devices without storing or maintaining security contexts for the client devices, thereby avoiding consumption of a substantial amount of resources at network entities (e.g., a network access node or other network entity). Security features may be anchored at a new network function (referred to as the IoT Function (IoTF)). Dedicated resources are allocated for IoT data transfer in order to avoid affecting normal client device's PDN connection/traffic. Encrypted client device contexts and encrypted network reachability contexts may be used for data transfer to eliminate the client device's semi-persistent context at the IoTF when the client device is in the idle state. Consequently, network nodes (e.g., MME/S-GW) do not need to maintain large amounts of network state information (i.e., contexts) of client devices that do not transmit traffic frequently. Client devices may employ cost-effective data delivery without exhausting valuable core network resources.

Therefore, the aspects described herein may reduce the aforementioned overhead for a client device (e.g., a client device operating as an IoT device, such as a client device operating in a reduced data transfer mode or a low power consumption mode). For example, the client device may send traffic to the user plane network function (e.g., IoTF-U) provisioned with the client device security context by the control plane network function (e.g., IoTF-C). As such, the network access node (e.g., eNB, base station, or network access point) may forward the traffic (e.g., packets from the client device) to the next hop node (e.g., IoTF-U) indicated by the client device without verifying the packet.

The IoTF-C may perform authentication and key agreements with the client device and establish the client device security context for the control plane. For example, the client device security context may include the control plane key that is used for control plane signaling protection (e.g., encryption and integrity protection). Furthermore, the IoTF-C may derive the user plane key for user plane packet protection (e.g., encryption and integrity protection) and may provide the user plane key to the IoTF-U.

The client device may derive the same control-plane and user-plane keys as the IoTF-C. Therefore, the client device may use control plane keys or user plane keys to send a packet, depending on whether the client device is communicating with the control plane IoTF or user plane IoTF without establishing a connection (e.g., client device may make determination so different security keys or context may be applied).

First Exemplary Apparatus (e.g., Client Device) and Method Thereon

Figure 15:
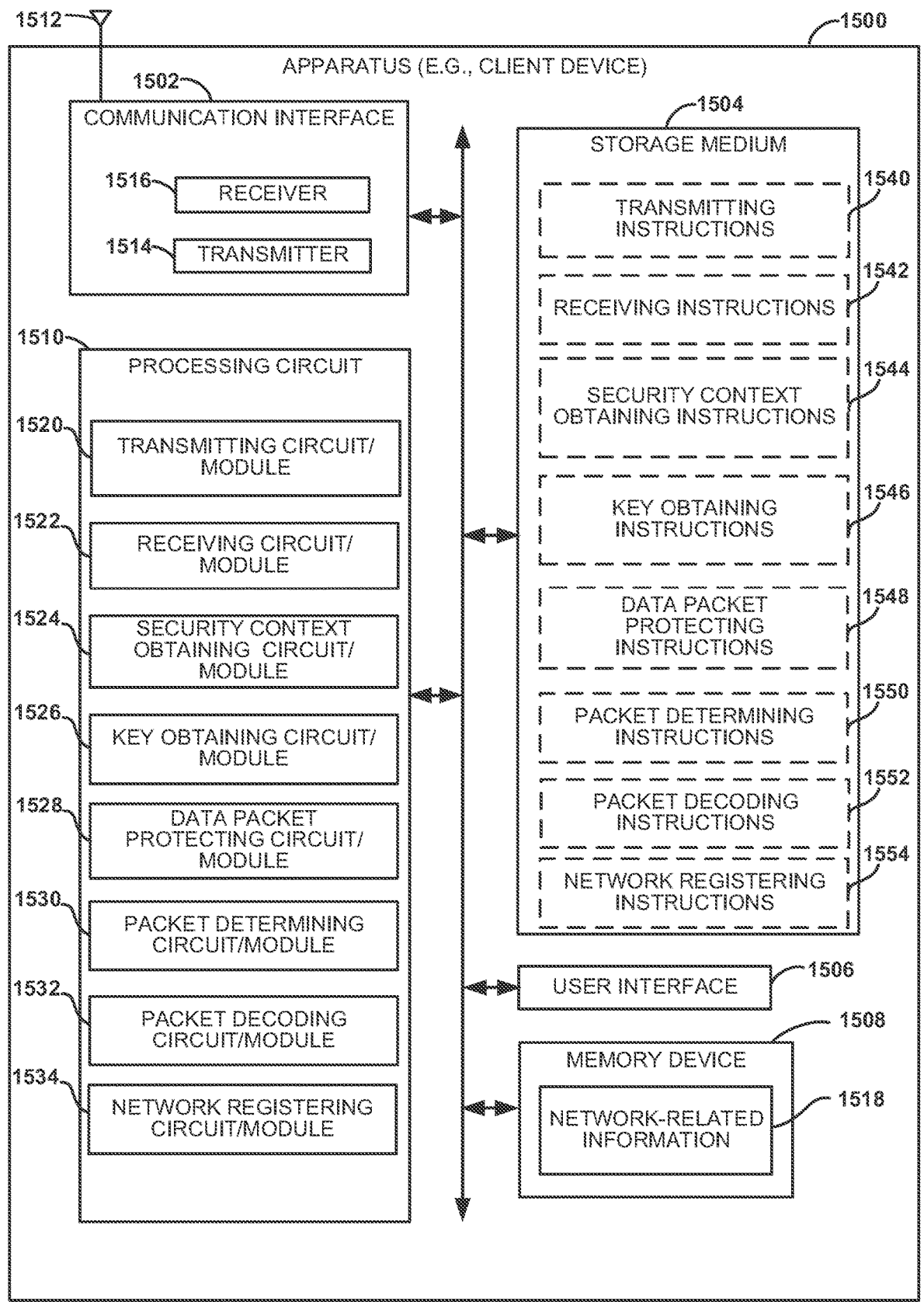
FIG. 15 is an illustration of an apparatus configured to communicate in an IoT network architecture according to one or more aspects of the present disclosure.

FIG. 15 is an illustration of an apparatus 1500 configured to communicate with a network based on an IoT network architecture according to one or more aspects of the disclosure (e.g., aspects related to the method of FIG. 16 described below). In an aspect, the apparatus 1500 may be a client device (e.g., an IoT device). The apparatus 1500 includes a communication interface (e.g., at least one transceiver) 1502, a storage medium 1504, a user interface 1506, a memory device 1508, and a processing circuit 1510.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 may be adapted to facilitate wireless communication of the apparatus 1500. For example, the communication interface 1502 may include circuitry and/or code (e.g., instructions) adapted to facilitate the communication of information bi-directionally with respect to one or more communication devices in a network. The communication interface 1502 may be coupled to one or more antennas 1512 for wireless communication within a wireless communication system. The communication interface 1502 can be configured with one or more standalone receivers and/or transmitters, as well as one or more transceivers. In the illustrated example, the communication interface 1502 includes a transmitter 1514 and a receiver 1516.

The memory device 1508 may represent one or more memory devices. As indicated, the memory device 1508 may maintain network-related information/along with other information used by the apparatus 1500. In some implementations, the memory device 1508 and the storage medium 1504 are implemented as a common memory component. The memory device 1508 may also be used for storing data that is manipulated by the processing circuit 1510 or some other component of the apparatus 1500.

The storage medium 1504 may represent one or more computer-readable, machine-readable, and/or processor-readable devices for storing code, such as processor executable code or instructions (e.g., software, firmware), electronic data, databases, or other digital information. The storage medium 1504 may also be used for storing data that is manipulated by the processing circuit 1510 when executing code. The storage medium 1504 may be any available media that can be accessed by a general purpose or special purpose processor, including portable or fixed storage devices, optical storage devices, and various other mediums capable of storing, containing or carrying code.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Code and/or instructions stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols.

The processing circuit 1510 is generally adapted for processing, including the execution of such code/instructions stored on the storage medium 1504. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired code provided by appropriate media in at least one example. For example, the processing circuit 1510 may be implemented as one or more processors, one or more controllers, and/or other structure configured to execute executable code. Examples of the processing circuit 1510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. As used herein, the term "adapted" in relation to the processing circuit 1510 may refer to the processing circuit 1510 being one or more of configured, employed, implemented, and/or programmed to perform a particular process, function, operation and/or routine according to various features described herein.

Figure 16:
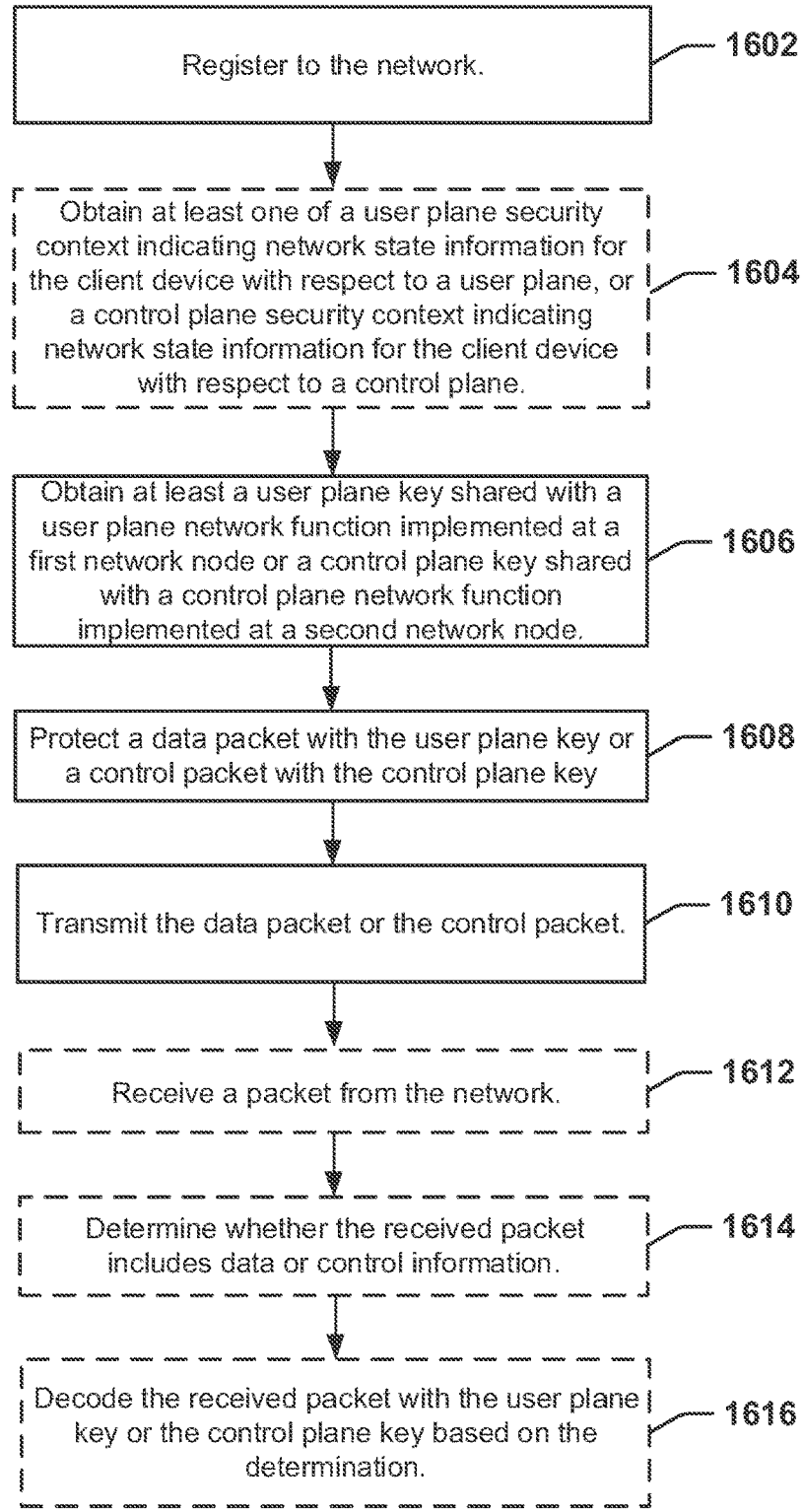
FIG. 16 is a flowchart illustrating a method for an apparatus for communicating in an IoT network architecture in accordance with various aspects of the present disclosure.

According to at least one example of the apparatus 1500, the processing circuit 1510 may include one or more of a transmitting circuit/module 1520, a receiving circuit/module 1522, a security context obtaining circuit/module 1524, a key obtaining circuit/module 1526, a data packet protecting circuit/module 1528, a packet determining circuit/module 1530, a packet decoding circuit/module 1532, and/or a network registering circuit/module 1534 that are adapted to perform any or all of the features, processes, functions, operations and/or routines described herein (e.g., features, processes, functions, operations and/or routines described with respect to FIG. 16).

The transmitting circuit/module 1520 may include circuitry and/or instructions (e.g., transmitting instructions 1540 stored on the storage medium 1504) adapted to perform several functions relating to, for example, transmitting a request to attach to the network and/or transmitting a data packet or the control packet. For example, in one aspect, the data packet may be a data packet that has been protected with a user plane key and the control packet may be a control packet that has been protected with a control plane key.

The receiving circuit/module 1522 may include circuitry and/or instructions (e.g., receiving instructions 1542 stored on the storage medium 1504) adapted to perform several functions relating to, for example, receiving, from the network, a message associated with an authentication procedure, and receiving a packet from the network.

The security context obtaining circuit/module 1524 may include circuitry and/or instructions (e.g., security context obtaining instructions 1544 stored on the storage medium 1504) adapted to perform several functions relating to, for example, obtaining at least one of a user plane security context indicating network state information for the client device with respect to a user plane, or a control plane security context indicating network state information for the client device with respect to a control plane.

The key obtaining circuit/module 1526 may include circuitry and/or instructions (e.g., key obtaining instructions 1546 stored on the storage medium 1504) adapted to perform several functions relating to, for example, obtaining at least a user plane key shared with a user plane network function implemented at a first network node or a control plane key shared with a control plane network function implemented at a second network node.

The data packet protecting circuit/module 1528 may include circuitry and/or instructions (e.g., data packet protecting instructions 1548 stored on the storage medium 1504) adapted to perform several functions relating to, for example, protecting a data packet with the user plane key or a control packet with the control plane key. In an aspect, the data packet includes first destination information indicating that the data packet is to be processed at the first network node, the first destination information enabling a network access node to forward the data packet to the first network node. In an aspect, the control packet includes second destination information indicating that the control packet is to be processed at the second network node, the second destination information enabling the network access node to forward the control packet to the second network node.

The packet determining circuit/module 1530 may include circuitry and/or instructions (e.g., packet determining instructions 1550 stored on the storage medium 1504) adapted to perform several functions relating to, for example, determining whether the received packet includes data or control information.

The packet decoding circuit/module 1532 may include circuitry and/or instructions (e.g., packet decoding instructions 1552 stored on the storage medium 1504) adapted to perform several functions relating to, for example, decoding the received packet with the user plane key or the control plane key.

The network registering circuit/module 1534 may include circuitry and/or instructions (e.g., network registering instructions 1554 stored on the storage medium 1504) adapted to perform several functions relating to, for example, registering to a network as an Internet of Things device As mentioned above, instructions stored by the storage medium 1504, when executed by the processing circuit 1510, causes the processing circuit 1510 to perform one or more of the various functions and/or process operations described herein. For example, the storage medium 1504 may include one or more of the transmitting instructions 1540, a receiving instructions 1542, security context obtaining instructions 1544, key obtaining instructions 1546, data packet protecting instructions 1548, packet determining instructions 1550, packet decoding instructions 1552, and/or network registering instructions 1554.

FIG. 16 is a flowchart 1600 illustrating a method for communicating with a network in accordance with various aspects of the disclosure. The method may be performed by an apparatus such as a client device (e.g., the client device 102, 502, 702, or the apparatus 1500). It should be understood that the operations indicated by dashed lines in FIG. 16 represent optional operations.

The client device registers to the network 1602. In an aspect, the client device may register to the network by transmitting a request to attach to the network and by receiving, from the network, a message associated with an authentication procedure in response to the request. In an aspect, the attach request may provide one or more indications such as, for example, that the client device is to attach as an Internet of Things device, that the client device is to attach in a reduced data transfer mode, and/or that the client device is to attach in a low power consumption mode.

The client device obtains at least one of a user plane security context indicating network state information for the client device with respect to a user plane, or a control plane security context indicating network state information for the client device with respect to a control plane 1604. In one example, the client device may obtain the user plane security context by deriving a first encryption key and a first integrity key based on the user plane key. In another example, the client device may obtain the control plane security context by deriving a second encryption key and a second integrity key based on the control plane key. In an aspect, the user plane security context or the control plane security context does not include access stratum security protection.

The client device obtains at least a user plane key shared with a user plane network function implemented at a first network node or a control plane key shared with a control plane network function implemented at a second network node 1606. For example, the client device may obtain the user plane key or the control plane key based on the message associated with the authentication procedure.

The client device protects a data packet with the user plane key or a control packet with the control plane key 1608. In one example, the data packet may be encrypted or integrity protected, or both encrypted and integrity protected, based on the user plane key. In another example, the control packet is encrypted or integrity protected, or both encrypted and integrity protected, based on the control plane key.

In an aspect, the data packet includes first destination information indicating that the data packet is to be processed at the first network node, the first destination information enabling a network access node to forward the data packet to the first network node. In an aspect, the control packet includes second destination information indicating that the control packet is to be processed at the second network node, the second destination information enabling the network access node to forward the control packet to the second network node.

The apparatus transmits the data packet or the control packet 1610. The apparatus receives a packet from the network 1612. In an aspect, a user plane Internet of Things Function identifier (IID) or a control plane Internet of Things Function identifier (IID) is included in a header of the received packet under one or more conditions. The one or more conditions may include, for example, when the client device is registered to the network as an Internet of Things device, when the client device operates in a low power consumption mode, or when the client device is configured to transfer a reduced amount of data.

The client device determines whether the received packet includes data or control information 1614. The client device decodes the received packet with the user plane key or the control plane key based on the determination 1616. In an aspect, the client device decodes the received packet by decrypting and verifying the received packet with the user plane key or the control plane key. In an aspect, the client device verifies the received packet by determining a first message authentication code (MAC) and comparing the first MAC to a second MAC associated with the received packet. For example, the first MAC may be determined by applying a message authentication code generation algorithm based on the received packet and using either the user plane key or the control plane key.

Second Exemplary Apparatus (e.g., Network Access Node) and Method Thereon

Figure 17:
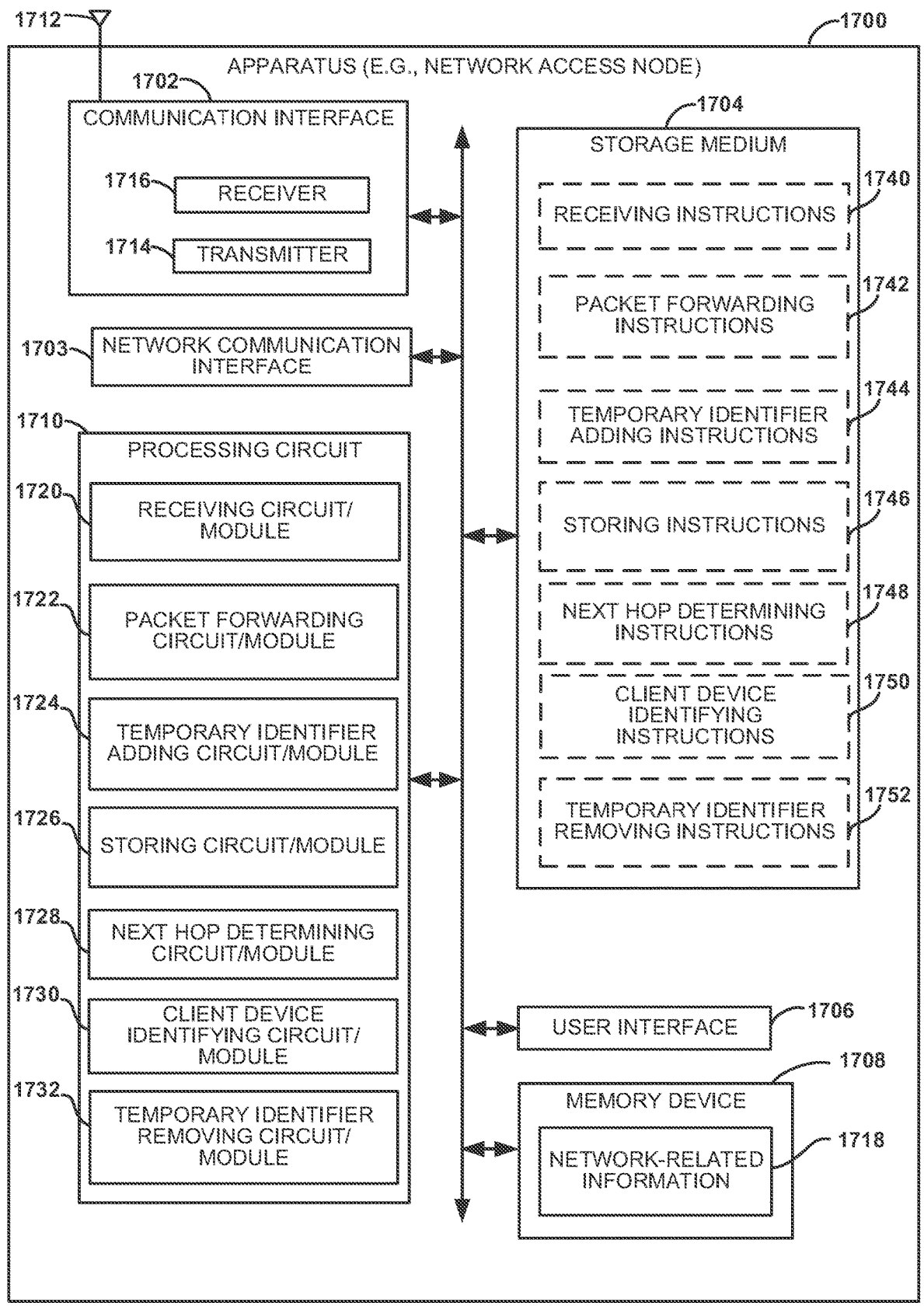
FIG. 17 is an illustration of an apparatus configured to communicate in an IoT network architecture according to one or more aspects of the present disclosure.

FIG. 17 is an illustration of an apparatus 1700 configured to communicate with a network based on an IoT network architecture according to one or more aspects of the disclosure (e.g., aspects related to the method of FIG. 18 described below). In an aspect, the apparatus 1700 may be a network access node (e.g., eNB, base station, or network access point). The apparatus 1700 includes a communication interface (e.g., at least one transceiver) 1702, a network communication interface 1703, a storage medium 1704, a user interface 1706, a memory device 1708, and a processing circuit 1710.

These components can be coupled to and/or placed in electrical communication with one another via a signaling bus or other suitable component, represented generally by the connection lines in FIG. 17. The signaling bus may include any number of interconnecting buses and bridges depending on the specific application of the processing circuit 1710 and the overall design constraints. The signaling bus links together various circuits such that each of the communication interface 1702, network communication interface 1703, the storage medium 1704, the user interface 1706, and the memory device 1708 are coupled to and/or in electrical communication with the processing circuit 1710. The signaling bus may also link various other circuits (not shown) such as timing sources, peripherals, voltage regulators, and power management circuits, which are well known in the art, and therefore, will not be described any further.

The communication interface 1702 may be adapted to facilitate wireless communication of the apparatus 1700. For example, the communication interface 1702 may include circuitry and/or code (e.g., instructions) adapted to facilitate the communication of information bi-directionally with respect to one or more client devices in a network. The communication interface 1702 may be coupled to one or more antennas 1712 for wireless communication within a wireless communication system. The communication interface 1702 can be configured with one or more standalone receivers and/or transmitters, as well as one or more transceivers. In the illustrated example, the communication interface 1702 includes a transmitter 1714 and a receiver 1716.

The network communication interface 1703 may be adapted to facilitate communication of the apparatus 1700. For example, the network communication interface 1703 may include circuitry and/or code (e.g., instructions) adapted to facilitate the communication of information bi-directionally with respect to one or more network entities in a network. The network communication interface 1703 can be configured with one or more standalone receivers and/or transmitters, as well as one or more transceivers.

The memory device 1708 may represent one or more memory devices. As indicated, the memory device 1708 may maintain network-related information/along with other information used by the apparatus 1700. In some implementations, the memory device 1708 and the storage medium 1704 are implemented as a common memory component. The memory device 1708 may also be used for storing data that is manipulated by the processing circuit 1710 or some other component of the apparatus 1700.

The storage medium 1704 may represent one or more computer-readable, machine-readable, and/or processor-readable devices for storing code, such as processor executable code or instructions (e.g., software, firmware), electronic data, databases, or other digital information. The storage medium 1704 may also be used for storing data that is manipulated by the processing circuit 1710 when executing code. The storage medium 1704 may be any available media that can be accessed by a general purpose or special purpose processor, including portable or fixed storage devices, optical storage devices, and various other mediums capable of storing, containing or carrying code.

By way of example and not limitation, the storage medium 1704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1704 may be embodied in an article of manufacture (e.g., a computer program product). By way of example, a computer program product may include a computer-readable medium in packaging materials. In view of the above, in some implementations, the storage medium 1704 may be a non-transitory (e.g., tangible) storage medium.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where at least one storage medium is integral to the processing circuit 1710 and/or examples where at least one storage medium is separate from the processing circuit 1710 (e.g., resident in the apparatus 1700, external to the apparatus 1700, distributed across multiple entities, etc.).

Code and/or instructions stored by the storage medium 1704, when executed by the processing circuit 1710, causes the processing circuit 1710 to perform one or more of the various functions and/or process operations described herein. For example, the storage medium 1704 may include operations configured for regulating operations at one or more hardware blocks of the processing circuit 1710, as well as to utilize the communication interface 1702 for wireless communication and the network communication interface 1703 for network communication utilizing their respective communication protocols.

The processing circuit 1710 is generally adapted for processing, including the execution of such code/instructions stored on the storage medium 1704. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1710 is arranged to obtain, process and/or send data, control data access and storage, issue commands, and control other desired operations. The processing circuit 1710 may include circuitry configured to implement desired code provided by appropriate media in at least one example. For example, the processing circuit 1710 may be implemented as one or more processors, one or more controllers, and/or other structure configured to execute executable code. Examples of the processing circuit 1710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1710 are for illustration and other suitable configurations within the scope of the disclosure are also contemplated.

According to one or more aspects of the disclosure, the processing circuit 1710 may be adapted to perform any or all of the features, processes, functions, operations and/or routines for any or all of the apparatuses described herein. As used herein, the term "adapted" in relation to the processing circuit 1710 may refer to the processing circuit 1710 being one or more of configured, employed, implemented, and/or programmed to perform a particular process, function, operation and/or routine according to various features described herein.

According to at least one example of the apparatus 1700, the processing circuit 1710 may include one or more of a receiving circuit/module 1720, a data packet forwarding circuit/module 1722, a temporary identifier adding circuit/module 1724, a storing circuit/module 1726, a next hop determining circuit/module 1728, a client device identifying circuit/module 1730, and a temporary identifier removing circuit/module 1732 that are adapted to perform any or all of the features, processes, functions, operations and/or routines described herein (e.g., features, processes, functions, operations and/or routines described with respect to FIG. 18).

The receiving circuit/module 1720 may include circuitry and/or instructions (e.g., the receiving instructions 1740 stored on the storage medium 1704) adapted to perform several functions relating to, for example, receiving, from the client device, a request to attach to a network with an indication of the network attach mode, where the network attach mode is a reduced data transfer mode or a low power consumption mode, receiving a first packet from a client device, and receiving a second packet from a network node.

The packet forwarding circuit/module 1722 may include circuitry and/or instructions (e.g., the packet forwarding instructions 1742 stored on the storage medium 1704) adapted to perform several functions relating to, for example, forwarding the first packet to the next hop network node, and forwarding the second packet received from the network node to the client device.

The temporary identifier adding circuit/module 1724 may include circuitry and/or instructions (e.g., the temporary identifier adding instructions 1744 stored on the storage medium 1704) adapted to perform several functions relating to, for example, adding, to the first packet, a temporary identifier associated with the client device. In an aspect, the first packet is a data packet or a control packet. In an aspect, the temporary identifier is a cell radio network temporary identifier (C-RNTI).

The storing circuit/module 1726 may include circuitry and/or instructions (e.g., the storing instructions 1746 stored on the storage medium 1704) adapted to perform several functions relating to, for example, storing the temporary identifier. In an aspect, the temporary identifier is stored for a predetermined period of time.

The next hop determining circuit/module 1728 may include circuitry and/or instructions (e.g., the next hop determining instructions 1748 stored on the storage medium 1704) adapted to perform several functions relating to, for example, determining a next hop network node based on a network attach mode of the client device. In an aspect, the determination of the next hop network node is based on preconfigured information at the network access node or based on destination information included in the first packet when the network attach mode of the client device is the reduced data transfer mode or the low power consumption mode. In an aspect, the destination information includes a network function identifier that enables identification of a network node or network device implementing a network function. In an aspect, the network function identifier is associated with a control plane network function implemented at a first network node or a user plane network function implemented at a second network node.

The client device identifying circuit/module 1730 may include circuitry and/or instructions (e.g., client device identifying instructions 1750 stored on the storage medium 1704) adapted to perform several functions relating to, for example, identifying the client device from a temporary identifier in the second packet. In an aspect, the second packet is a data packet or a control packet The temporary identifier removing circuit/module 1732 may include circuitry and/or instructions (e.g., the temporary identifier removing instructions 1752 stored on the storage medium 1704) adapted to perform several functions relating to, for example, removing the temporary identifier from the second packet prior to forwarding the second packet.

As mentioned above, instructions stored by the storage medium 1704, when executed by the processing circuit 1710, causes the processing circuit 1710 to perform one or more of the various functions and/or process operations described herein. For example, the storage medium 1704 may include one or more of the receiving instructions 1740, the packet forwarding instructions 1742, the temporary identifier adding instructions 1744, the storing instructions 1746, the next hop determining instructions 1748, the client device identifying instructions 1750, and the temporary identifier removing instructions 1752.

Figure 18A:
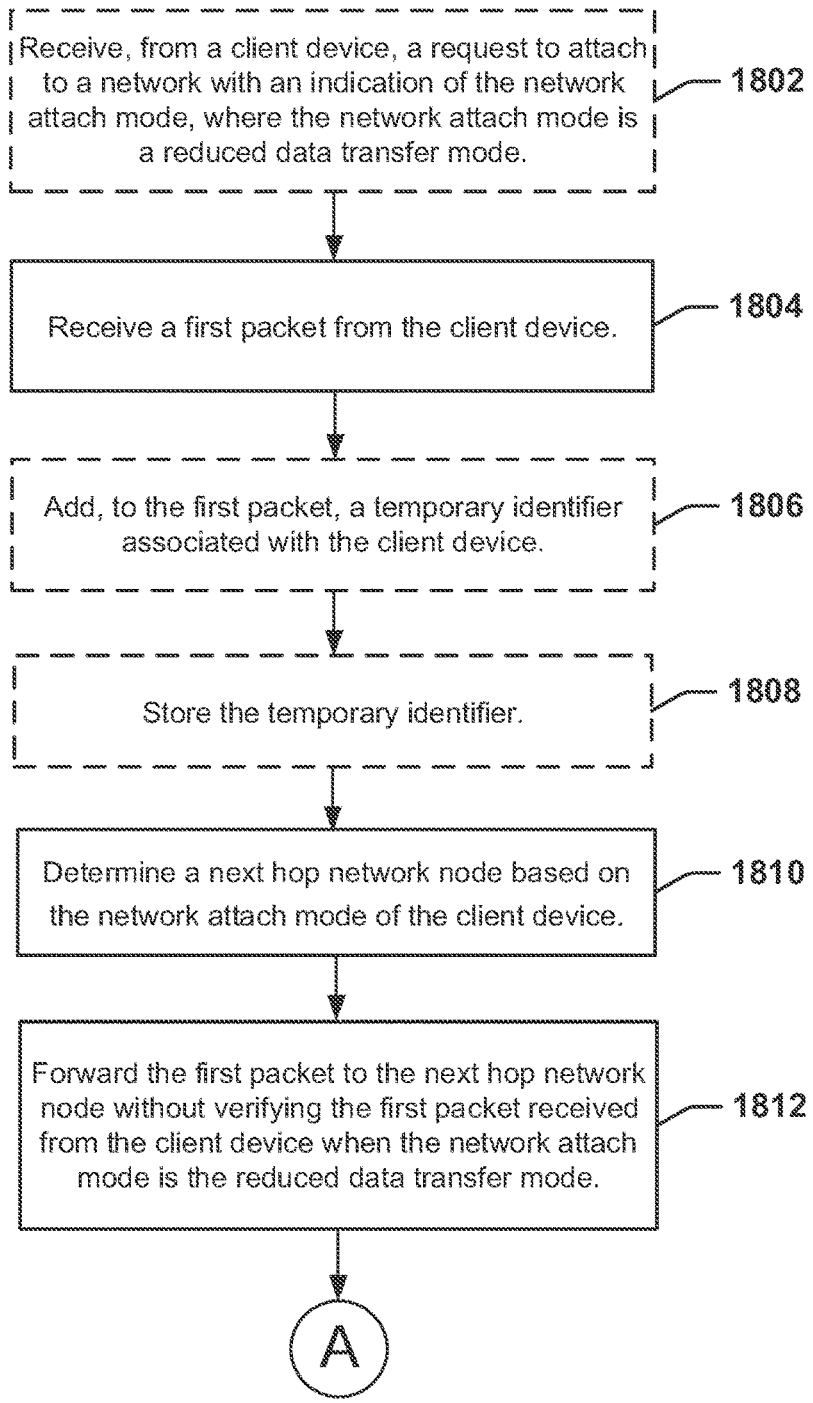
FIG. 18 (including FIGS. 18A and 18B) is a flowchart illustrating a method for an apparatus for communicating in an IoT network architecture in accordance with various aspects of the present disclosure.
Figure 18B:
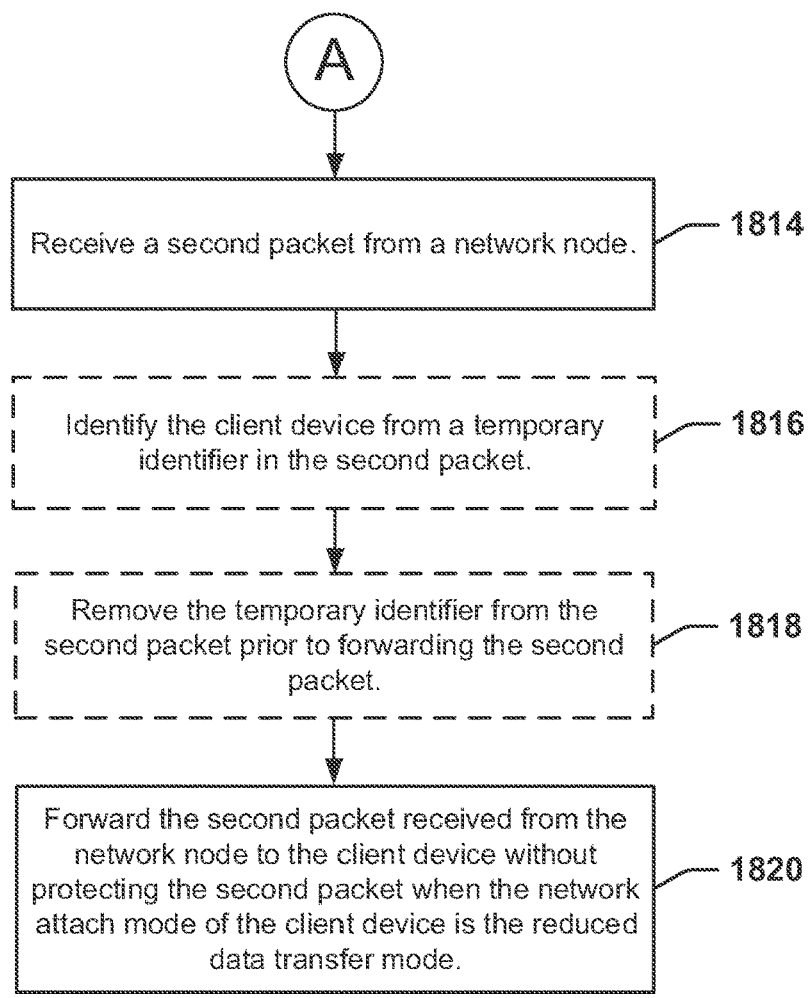

FIG. 18 (including FIGS. 18A and 18B) is a flowchart 1800 illustrating a method for communicating in an IoT network architecture in accordance with various aspects of the present disclosure. The method may be performed by an apparatus such as a network access node (e.g., the network access node 104 of FIG. 1 or apparatus 1700 of FIG. 17). It should be understood that the operations indicated by dashed lines in FIG. 18 represent optional operations.

With reference to FIG. 18A, the network access node receives, from the client device, a request to attach to a network with an indication of the network attach mode, where the network attach mode is a reduced data transfer mode 1802. In other aspects, the network attach mode may be an Internet of Things (IoT) device mode or a low power consumption mode. The network access node receives a first packet from the client device 1804. For example, the first packet may be a data packet or a control packet.

The first network node adds, to the first packet, a temporary identifier associated with the client device 1806. In an aspect of the present disclosure, the temporary identifier is a cell radio network temporary identifier (C-RNTI). The network access node stores the temporary identifier 1808. In an aspect of the present disclosure, the temporary identifier is stored for a predetermined period of time.

The network access node determines a next hop network node based on a network attach mode of the client device 1810. In an aspect of the present disclosure, the determination of the next hop network node is preconfigured at the network access node. In an aspect of the present disclosure, the next hop network node may be determined based on destination information included in the first packet when the network attach mode of the client device is the IoT device mode, the reduced data transfer mode, or the low power consumption mode. For example, the destination information may include a network function identifier that enables identification of a network node implementing a network function. In an aspect, the network function identifier is associated with a control plane network function implemented at a first network node or a user plane network function implemented at a second network node.

The network access node forwards the first packet to the next hop network node without verifying the first packet received from the client device when the network attach mode is a reduced data transfer mode 1812.

With reference to FIG. 18B, the network access node receives a second packet from a network node 1814. For example, the second packet may be a data packet or a control packet. The network access node identifies the client device from a temporary identifier in the second packet 1816. The network access node removes the temporary identifier from the second packet prior to forwarding the second packet 1818. The network access node forwards the second packet received from the network node to the client device without protecting the second packet when the network attach mode of the client device is the reduced data transfer mode 1820.

Third Exemplary Apparatus (e.g., Network Device) and Method Thereon

Figure 19:
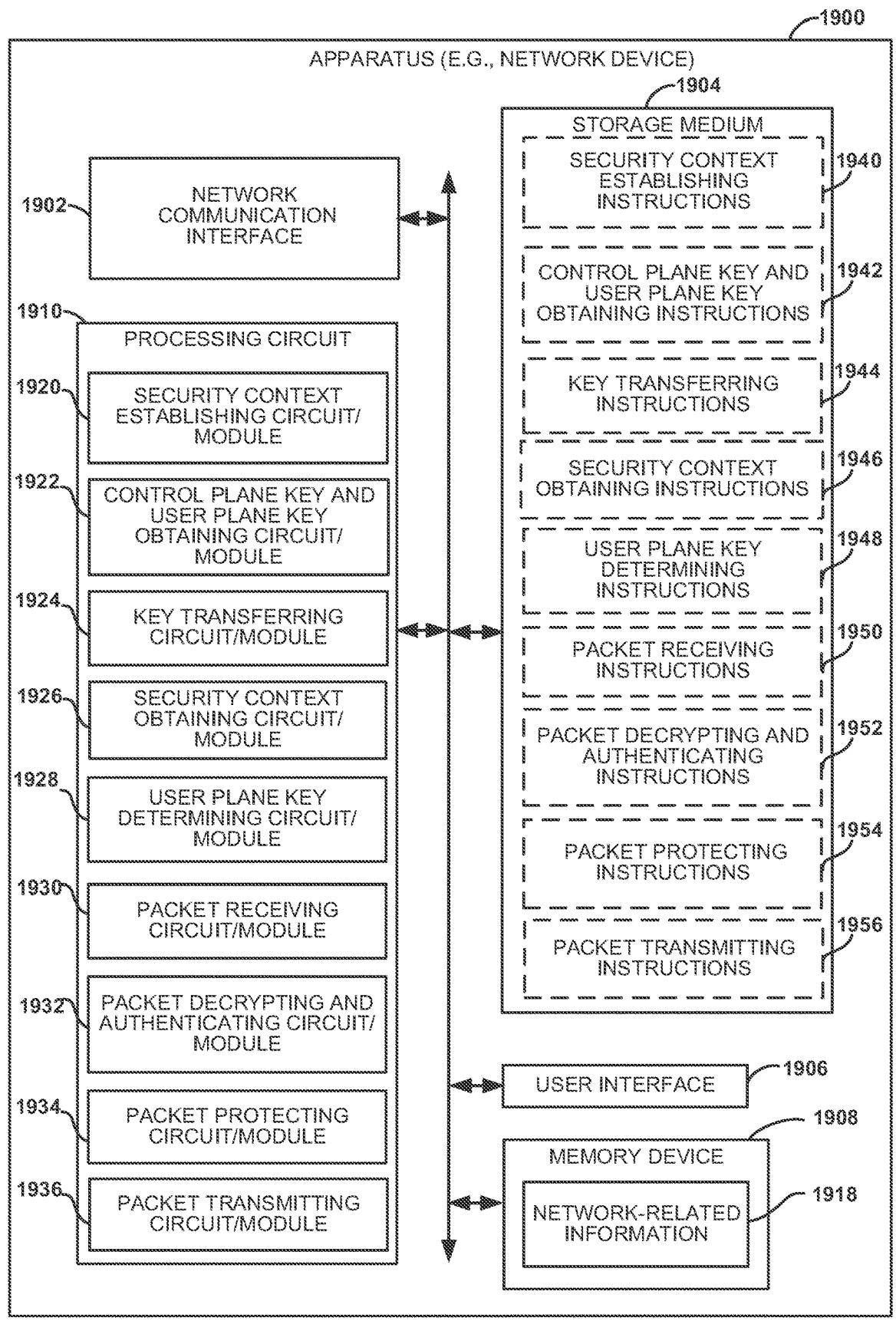
FIG. 19 is an illustration of an apparatus configured to communicate in an IoT network architecture according to one or more aspects of the disclosure.

FIG. 19 is an illustration of an apparatus 1900 according to one or more aspects of the disclosure (e.g., aspects related to the method of FIGS. 20-22 described below). In an aspect, the apparatus 1900 may be a network device (e.g., network device 105, 505) that implements an Internet of Things (IoT) Function. For example, the IoT Function may include a control plane IoT Function (e.g., IoTF-C 106, 506, 706, 606, 906, 1406) and/or a user plane IoT Function (e.g., IoTF-U 108, 508, 608, 708, 806, 908) as previously discussed. In some aspects, the apparatus 1900 may be a network node that implements an IoT Function, such as the network node 107 that implements the IoTF-C 106 in FIG. 1 or the network node 109 that implements the IoTF-U 108 in FIG. 1. The apparatus 1900 includes a network communication interface (e.g., at least one transceiver) 1902, a storage medium 1904, a user interface 1906, a memory device 1908, and a processing circuit 1910.

These components can be coupled to and/or placed in electrical communication with one another via a signaling bus or other suitable component, represented generally by the connection lines in FIG. 19. The signaling bus may include any number of interconnecting buses and bridges depending on the specific application of the processing circuit 1910 and the overall design constraints. The signaling bus links together various circuits such that each of the network communication interface 1902, the storage medium 1904, the user interface 1906, and the memory device 1908 are coupled to and/or in electrical communication with the processing circuit 1910. The signaling bus may also link various other circuits (not shown) such as timing sources, peripherals, voltage regulators, and power management circuits, which are well known in the art, and therefore, will not be described any further.

The network communication interface 1902 may be adapted to facilitate communication of the apparatus 1900. For example, the network communication interface 1902 may include circuitry and/or code (e.g., instructions) adapted to facilitate the communication of information bi-directionally with respect to one or more network entities in a network. The network communication interface 1902 can be configured with one or more standalone receivers and/or transmitters, as well as one or more transceivers.

The memory device 1908 may represent one or more memory devices. As indicated, the memory device 1908 may maintain network-related information along with other information used by the apparatus 1900. In some implementations, the memory device 1908 and the storage medium 1904 are implemented as a common memory component. The memory device 1908 may also be used for storing data that is manipulated by the processing circuit 1910 or some other component of the apparatus 1900.

The storage medium 1904 may represent one or more computer-readable, machine-readable, and/or processor-readable devices for storing code, such as processor executable code or instructions (e.g., software, firmware), electronic data, databases, or other digital information. The storage medium 1904 may also be used for storing data that is manipulated by the processing circuit 1910 when executing code. The storage medium 1904 may be any available media that can be accessed by a general purpose or special purpose processor, including portable or fixed storage devices, optical storage devices, and various other mediums capable of storing, containing or carrying code.

By way of example and not limitation, the storage medium 1904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1904 may be embodied in an article of manufacture (e.g., a computer program product). By way of example, a computer program product may include a computer-readable medium in packaging materials. In view of the above, in some implementations, the storage medium 1904 may be a non-transitory (e.g., tangible) storage medium.

The storage medium 1904 may be coupled to the processing circuit 1910 such that the processing circuit 1910 can read information from, and write information to, the storage medium 1904. That is, the storage medium 1904 can be coupled to the processing circuit 1910 so that the storage medium 1904 is at least accessible by the processing circuit 1910, including examples where at least one storage medium is integral to the processing circuit 1910 and/or examples where at least one storage medium is separate from the processing circuit 1910 (e.g., resident in the apparatus 1900, external to the apparatus 1900, distributed across multiple entities, etc.).

Code and/or instructions stored by the storage medium 1904, when executed by the processing circuit 1910, causes the processing circuit 1910 to perform one or more of the various functions and/or process operations described herein. For example, the storage medium 1904 may include operations configured for regulating operations at one or more hardware blocks of the processing circuit 1910, as well as to utilize the network communication interface 1902 for communication utilizing their respective communication protocols.

The processing circuit 1910 is generally adapted for processing, including the execution of such code/instructions stored on the storage medium 1904. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1910 is arranged to obtain, process and/or send data, control data access and storage, issue commands, and control other desired operations. The processing circuit 1910 may include circuitry configured to implement desired code provided by appropriate media in at least one example. For example, the processing circuit 1910 may be implemented as one or more processors, one or more controllers, and/or other structure configured to execute executable code. Examples of the processing circuit 1910 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1910 are for illustration and other suitable configurations within the scope of the disclosure are also contemplated.

According to one or more aspects of the disclosure, the processing circuit 1910 may be adapted to perform any or all of the features, processes, functions, operations and/or routines for any or all of the apparatuses described herein. As used herein, the term "adapted" in relation to the processing circuit 1910 may refer to the processing circuit 1910 being one or more of configured, employed, implemented, and/or programmed to perform a particular process, function, operation and/or routine according to various features described herein.

Figure 20:
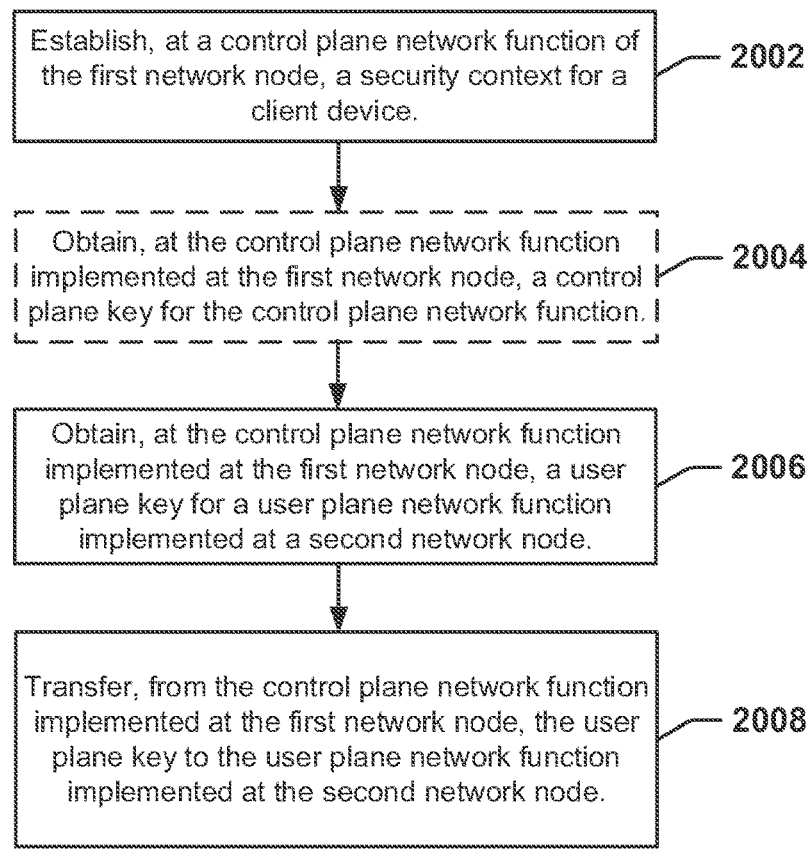
FIG. 20 is a flowchart illustrating a method for an apparatus for communicating in an IoT network architecture in accordance with various aspects of the disclosure.
Figure 21:
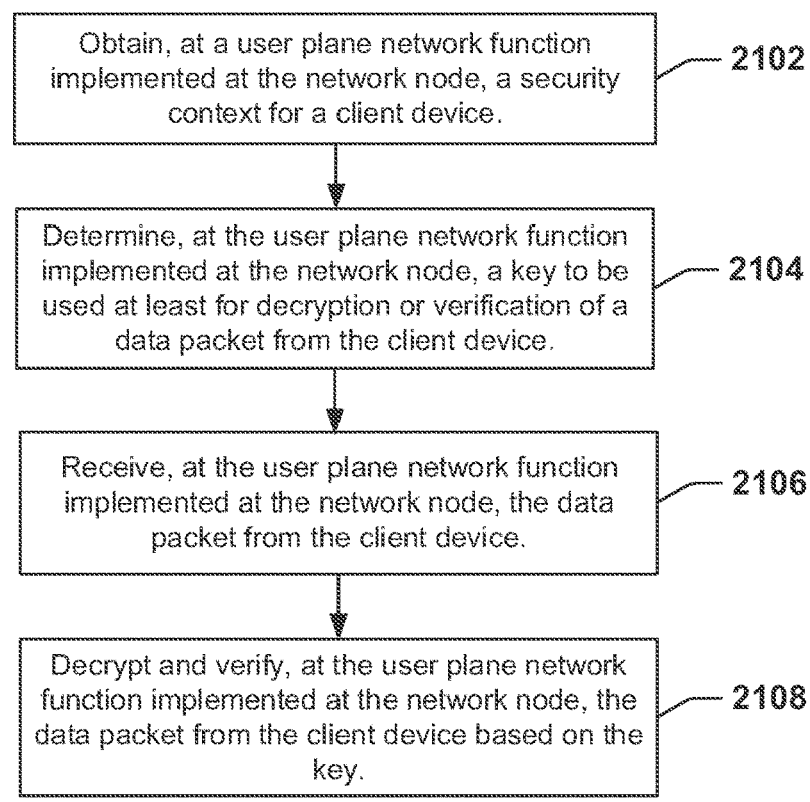
FIG. 21 is a flowchart illustrating a method for an apparatus for communicating in an IoT network architecture in accordance with various aspects of the disclosure.
Figure 22:
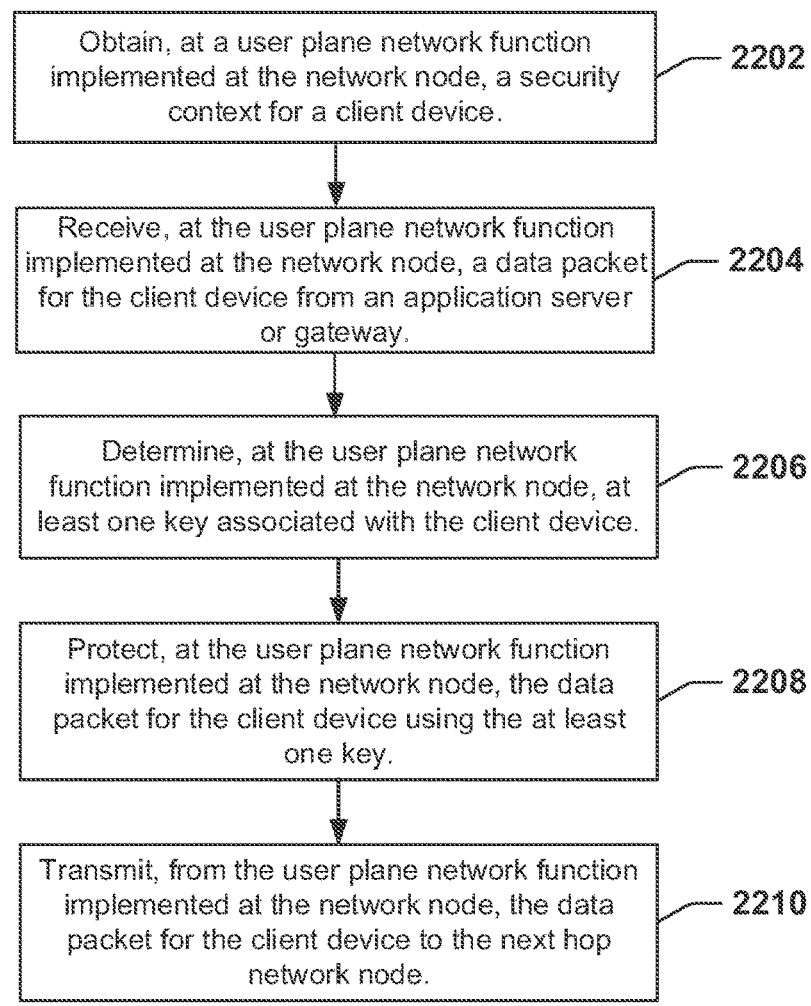
FIG. 22 is a flowchart illustrating a method for an apparatus for communicating in an IoT network architecture in accordance with various aspects of the disclosure.

According to at least one example of the apparatus 1900, the processing circuit 1910 may include one or more of a security context establishing circuit/module 1920, a control plane key and user plane key obtaining circuit/module 1922, a key transferring circuit/module 1924, a security context obtaining circuit/module 1926, a user plane key determining circuit/module 1928, a packet receiving circuit/module 1930, a packet decrypting and authenticating circuit/module 1932, a packet protecting circuit/module 1934, and a packet transmitting circuit/module 1936 that are adapted to perform any or all of the features, processes, functions, operations and/or routines described herein (e.g., features, processes, functions, operations and/or routines described with respect to FIGS. 20-22).

The security context establishing circuit/module 1920 may include circuitry and/or instructions (e.g., the security context establishing instructions 1940 stored on the storage medium 1904) adapted to perform several functions relating to, for example, establishing, at a control plane network function implemented at a first network node, a security context for a client device.

The control plane key and user plane key obtaining circuit/module 1922 may include circuitry and/or instructions (e.g., the control plane key and user plane key generating obtaining 1942 stored on the storage medium 1904) adapted to perform several functions relating to, for example, obtaining, at the control plane network function implemented at the first network node, a control plane key for the control plane network function, and/or obtaining, at the control plane network function implemented at the first network node, a user plane key for a user plane network function implemented at a second network node.

The key transferring circuit/module 1924 may include circuitry and/or instructions (e.g., the key transferring instructions 1944 stored on the storage medium 1904) adapted to perform several functions relating to, for example, transferring, from the control plane network function implemented at the first network node, the user plane key to the user plane network function implemented at a second network node.

The security context obtaining circuit/module 1926 may include circuitry and/or instructions (e.g., the security context obtaining instructions 1946 stored on the storage medium 1904) adapted to perform several functions relating to, for example, obtaining, at a user plane network function implemented at the network node, a security context for a client device.

The user plane key determining circuit/module 1928 may include circuitry and/or instructions (e.g., the user plane key determining instructions 1948 stored on the storage medium 1904) adapted to perform several functions relating to, for example, determining, at the user plane network function implemented at the network node, a key to be used at least for decryption or verification of a data packet from the client device and/or determining, at the user plane network function implemented at the network node, at least one key associated with the client device.

The packet receiving circuit/module 1930 may include circuitry and/or instructions (e.g., the packet receiving instructions 1950 stored on the storage medium 1904) adapted to perform several functions relating to, for example, receiving, at the user plane network function implemented at the network node, a data packet from the client device and/or receiving, at the user plane network function implemented at the network node, a data packet for the client device from an application server or gateway.

The packet decrypting and authenticating circuit/module 1932 may include circuitry and/or instructions (e.g., the packet decrypting and authenticating instructions 1952 stored on the storage medium 1904) adapted to perform several functions relating to, for example, decrypting and verifying, at the user plane network function implemented at the network node, the data packet from the client device based on the key.

The packet protecting circuit/module 1934 may include circuitry and/or instructions (e.g., the packet protecting instructions 1954 stored on the storage medium 1904) adapted to perform several functions relating to, for example, protecting, at the user plane network function implemented at the network node, the data packet for the client device using the at least one key.

The packet transmitting circuit/module 1936 may include circuitry and/or instructions (e.g., the packet transmitting instructions 1956 stored on the storage medium 1904) adapted to perform several functions relating to, for example, transmitting, from the user plane network function implemented at the network node, the data packet for the client device to the next hop network node.

As mentioned above, instructions stored by the storage medium 1904, when executed by the processing circuit 1910, causes the processing circuit 1910 to perform one or more of the various functions and/or process operations described herein. For example, the storage medium 1904 may include one or more of the security context establishing instructions 1940, control plane key and user plane key obtaining instructions 1942, key transferring instructions 1944, security context obtaining instructions 1946, user plane key determining instructions 1948, packet receiving instructions 1950, packet decrypting and authenticating instructions 1952, packet protecting instructions 1954, and packet transmitting instructions 1956.

FIG. 20 is a flowchart 2000 illustrating a method for communicating in an IoT network architecture in accordance with various aspects of the disclosure. The method may be performed by an apparatus such as a first network node. For example, the first network node (e.g., the network node 707) may implement a control plane network function (e.g., the IoTF-C 706). The first network node establishes, at a control plane network function implemented at the network node, a security context for a client device 2002. In an aspect, the first network node establishes the security context for the client device by performing a mutual authentication procedure with the client device.

The first network node obtains, at the control plane network function implemented at the first network node, a control plane key for the control plane network function 2004. The first network node obtains, at the control plane network function implemented at the first network node, a user plane key for a user plane network function implemented at a second network node 2006. In an aspect, the first network node obtains the user plane key by deriving the user plane key from a session credential established during the mutual authentication procedure. The first network node transfers, from the control plane network function implemented at the first network node, the user plane key to the user plane network function implemented at the second network node 2008.

FIG. 21 is a flowchart 2100 illustrating a method for communicating in an IoT network architecture in accordance with various aspects of the disclosure. The method may be performed by an apparatus such as a network node. For example, the network node (e.g., the network node 707) may implement a user plane network function (e.g., the IoTF-U 708). The network node obtains, at a user plane network function implemented at the network node, a security context for a client device 2102. In an aspect, the network node obtains the security context by receiving the security context from a control plane network function of the network node. The network node determines, at the user plane network function implemented at the network node, a key to be used at least for decryption or verification of a data packet from the client device 2104. The network node receives, at the user plane network function of the network node, the data packet from the client device 2106. The network node decrypts and verifies, at the user plane network function implemented at the network node, the data packet from the client device based on the key 2108.

FIG. 22 is a flowchart 2200 illustrating a method for communicating in an IoT network architecture in accordance with various aspects of the disclosure. The method may be performed by an apparatus such as a network node. For example, the network node (e.g., the network node 707) may implement a user plane network function (e.g., the IoTF-U 708).

The network node obtains, at a user plane network function implemented at the network node, a security context for a client device 2202. The network node receives, at the user plane network function implemented at the network node, a data packet for the client device from an application server or gateway 2204. The network node determines, at the user plane network function implemented at the network node, at least one key associated with the client device 2206. The network node protects, at the user plane network function implemented at the network node, the data packet for the client device using the at least one key 2208. The network node transmits, from the user plane network function implemented at the network node, the data packet for the client device to the next hop network node 2210.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a network access node, comprising:
receiving a first packet and an encrypted client device context from a client device, wherein the first packet is protected based on a user plane key, and wherein the encrypted client device context includes at least the user plane key and enables reconstruction of at least a security context for the client device, the security context enabling processing of the first packet;
determining a next hop network node based on a network attach mode of the client device; and
forwarding the first packet and the encrypted client device context to the next hop network node without verifying the first packet received from the client device when the network attach mode is a reduced data transfer mode.

2. The method of claim 1, further comprising:
receiving a second packet from a network node; and
forwarding the second packet received from the network node to the client device without protecting the second packet when the network attach mode of the client device is the reduced data transfer mode.

3. The method of claim 2, further comprising:
identifying the client device from a temporary identifier in the second packet, wherein the second packet is a data packet.

4. The method of claim 3, further comprising:
removing the temporary identifier from the second packet prior to forwarding the second packet.

5. The method of claim 1, further comprising:
receiving, from the client device, a request to attach to a network with an indication of the network attach mode, wherein the network attach mode is the reduced data transfer mode.

6. The method of claim 1, wherein the determination of the next hop network node is based on preconfigured information at the network access node or based on destination information included in the first packet, wherein the network attach mode is the reduced data transfer mode.

7. The method of claim 6, wherein the destination information includes a network function identifier that enables identification of a network node implementing a network function.

8. The method of claim 7, wherein the network function identifier is associated with a user plane network function implemented at a second network node.

9. The method of claim 1, further comprising:
adding, to the first packet, a temporary identifier associated with the client device, wherein the first packet is a data packet; and
storing the temporary identifier.

10. The method of claim 9, wherein the temporary identifier is a cell radio network temporary identifier (C-RNTI), and wherein the temporary identifier is stored for a predetermined period of time.

11. A network access node, comprising:
a communication circuit configured to communicate with one or more network entities; and
a processing circuit coupled to the communication circuit, the processing circuit configured to:
receive a first packet and an encrypted client device context from a client device, wherein the first packet is protected based on a user plane key, and wherein the encrypted client device context includes at least the user plane key and enables reconstruction of at least a security context for the client device, the security context enabling processing of the first packet;
determine a next hop network node based on a network attach mode of the client device; and
forward the first packet and the encrypted client device context to the next hop network node without verifying the first packet received from the client device when the network attach mode is a reduced data transfer mode.

12. The network access node of claim 11, wherein the processing circuit is further configured to:
receive a second packet from a network node; and
forward the second packet received from the network node to the client device without protecting the second packet when the network attach mode of the client device is the reduced data transfer mode.

13. The network access node of claim 12, wherein the processing circuit is further configured to:
identify the client device from a temporary identifier in the second packet, wherein the second packet is a data packet.

14. The network access node of claim 11, wherein the processing circuit is further configured to:
receive, from the client device, a request to attach to a network with an indication of the network attach mode, wherein the network attach mode is the reduced data transfer mode.

15. The network access node of claim 11, wherein the processing circuit is further configured to:
add, to the first packet, a temporary identifier associated with the client device, wherein the first packet is a data packet; and
store the temporary identifier.

16. A non-transitory processor-readable storage medium having instructions stored thereon, which when executed by at least one processing circuit causes the at least one processing circuit to:
receive a first packet and an encrypted client device context from a client device, wherein the first packet is protected based on a user plane key, and wherein the encrypted client device context includes at least the user plane key and enables reconstruction of at least a security context for the client device, the security context enabling processing of the first packet;
determine a next hop network node based on a network attach mode of the client device; and
forward the first packet and the encrypted client device context to the next hop network node without verifying the first packet received from the client device when the network attach mode is a reduced data transfer mode.

17. The non-transitory processor-readable storage medium of claim 16, wherein the instructions further cause the at least one processing circuit to:
  receive a second packet from a network node; and
  forward the second packet received from the network node to the client device without protecting the second packet when the network attach mode of the client device is the reduced data transfer mode.

18. The non-transitory processor-readable storage medium of claim 16, wherein the instructions further cause the at least one processing circuit to:
  receive, from the client device, a request to attach to a network with an indication of the network attach mode, wherein the network attach mode is the reduced data transfer mode.

19. The non-transitory processor-readable storage medium of claim 16, wherein the instructions further cause the at least one processing circuit to:
  add, to the first packet, a temporary identifier associated with the client device, wherein the first packet is a data packet; and
  store the temporary identifier.

20. The non-transitory processor-readable storage medium of claim 19, wherein the instructions further cause the at least one processing circuit to:
  identify the client device from a temporary identifier in the second packet, wherein the second packet is a data packet.

* * * * *